United States Patent
Lee et al.

(10) Patent No.: US 9,772,651 B2
(45) Date of Patent: Sep. 26, 2017

(54) EMBEDDED MULTIMEDIA CARD (EMMC), HOST CONTROLLING EMMC, AND METHOD OPERATING EMMC SYSTEM INCLUDING THE USE OF A SWITCH COMMAND DEFINING AN ADJUSTMENT DELAY FOR A DATA SIGNAL

(71) Applicant: SAMSUNG SEMICONDUCTOR CO., LTD., Suwon-si, Gyeonggi-Do (KR)

(72) Inventors: Jung Pil Lee, Hwaseong-si (KR); Young Gyu Kang, Yongin-si (KR); Sung Ho Seo, Seoul (KR); Myung Sub Shin, Suwon-si (KR); Kyung Phil Yoo, Seoul (KR); Kyoung Lae Cho, Suwon-si (KR); Jin Hyeok Choi, Yongin-si (KR); Seong Sik Hwang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 769 days.

(21) Appl. No.: 14/025,948

(22) Filed: Sep. 13, 2013

(65) Prior Publication Data

US 2014/0082398 A1    Mar. 20, 2014

(30) Foreign Application Priority Data

Sep. 14, 2012 (KR) .................. 10-2012-0102469
Sep. 14, 2012 (KR) .................. 10-2012-0102470

(51) Int. Cl.
*G06F 1/12* (2006.01)
*G06F 1/10* (2006.01)

(52) U.S. Cl.
CPC .................. *G06F 1/12* (2013.01); *G06F 1/10* (2013.01)

(58) Field of Classification Search
None
See application file for complete search history.

(56) References Cited

U.S. PATENT DOCUMENTS

| 6,600,681 | B1 * | 7/2003 | Korger ............... G11C 7/1066 365/193 |
| 6,971,582 | B2 | 12/2005 | Kim |
| 7,131,093 | B1 * | 10/2006 | Aden ............... G06F 17/5022 703/19 |
| 7,370,168 | B2 | 5/2008 | Kanamori et al. |
| 7,602,859 | B2 | 10/2009 | Cheng et al. |
| 7,827,431 | B2 | 11/2010 | Fujimoto |
| 7,888,966 | B1 | 2/2011 | Davidson et al. |

(Continued)

FOREIGN PATENT DOCUMENTS

| JP | 2006119963 | 5/2006 |
| JP | 2007249753 | 9/2007 |

(Continued)

*Primary Examiner* — Kim Huynh
*Assistant Examiner* — Danny Chan
(74) *Attorney, Agent, or Firm* — Volentine & Whitt, PLLC

(57) ABSTRACT

An embedded multimedia card (eMMC) is provided. The eMMC includes a clock channel receiving a clock output from a host, data channels receiving data signals from the host, and a command channel receiving a SWITCH command including delay offset values from the host so as to adjust a delay of at least one of the data signals, which are received, in response to the delay offset values.

13 Claims, 26 Drawing Sheets

(56) References Cited

U.S. PATENT DOCUMENTS

| | | | |
|---|---|---|---|
| 7,899,960 B2 | 3/2011 | Shibata et al. | |
| 7,907,693 B2 | 3/2011 | Bae et al. | |
| 2003/0005250 A1* | 1/2003 | Johnson | G06F 13/1689 |
| | | | 711/167 |
| 2004/0003331 A1* | 1/2004 | Salmon | G06F 13/4243 |
| | | | 714/738 |
| 2004/0088443 A1* | 5/2004 | Tran | G06F 13/4027 |
| | | | 710/1 |
| 2004/0123173 A1* | 6/2004 | Emberling | G06F 13/1689 |
| | | | 713/400 |
| 2005/0063163 A1* | 3/2005 | Hampel | H05K 1/0248 |
| | | | 361/728 |
| 2006/0227797 A1* | 10/2006 | Chandika | H04L 41/08 |
| | | | 370/419 |
| 2008/0205439 A1* | 8/2008 | Li | H04L 25/03878 |
| | | | 370/465 |
| 2009/0154256 A1* | 6/2009 | Kim | G11C 7/1051 |
| | | | 365/189.05 |
| 2009/0172459 A1* | 7/2009 | Felix | G06F 1/08 |
| | | | 713/601 |
| 2010/0131695 A1 | 5/2010 | Gyi et al. | |
| 2010/0169699 A1 | 7/2010 | Fujimoto | |
| 2010/0287335 A1 | 11/2010 | Chung et al. | |
| 2010/0325372 A1* | 12/2010 | Housty | G06F 13/1684 |
| | | | 711/154 |
| 2011/0093753 A1 | 4/2011 | Takagi | |
| 2011/0227234 A1 | 9/2011 | Nishizawa et al. | |
| 2011/0231694 A1 | 9/2011 | Sakamoto et al. | |
| 2012/0054531 A1 | 3/2012 | Murayama | |
| 2012/0106687 A1 | 5/2012 | Bulzacchelli et al. | |
| 2012/0272114 A1* | 10/2012 | Cho | G06F 11/141 |
| | | | 714/748 |

FOREIGN PATENT DOCUMENTS

| | | |
|---|---|---|
| JP | 2010244399 | 10/2010 |
| KR | 20080004963 A | 1/2006 |
| KR | 0845525 A | 2/2008 |

* cited by examiner

FIG. 9

| CSD-slice | Bit 7 | Bit 6 | Bit 5 | Bit 4 | Bit 3 | Bit 2 | Bit 1 | Bit 0 |
|---|---|---|---|---|---|---|---|---|
| 127 | Device RCLK Output delay offset | | | | Device Input CLK delay offset | | | |
| 126 | DAT[7] Device Input IO delay offset | | | | DAT[6] Device Input IO delay offset | | | |
| 125 | DAT[5] Device Input IO delay offset | | | | DAT[4] Device Input IO delay offset | | | |
| 124 | DAT[3] Device Input IO delay offset | | | | DAT[2] Device Input IO delay offset | | | |
| 123 | DAT[1] Device Input IO delay offset | | | | DAT[0] Device Input IO delay offset | | | |

| Bit 7/3 | Bit 6/2 | Bit 5/1 | Bit 4/0 |
|---|---|---|---|
| Sign | Device Input IO delay offset (0~3) | | |

FIG. 10

| | | | | | | | | | | | P Valid window | | PB Best offset | | |
|---|---|---|---|---|---|---|---|---|---|---|---|---|---|---|---|

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DAT0 | F | P | P | PB | P | F | F | F | F | F | F | F | F | F | F | F |
| DAT1 | F | F | P | P | PB | P | F | F | F | F | F | F | F | F | F | F |
| DAT2 | F | P | P | PB | P | P | F | F | F | F | F | F | F | F | F | F |
| DAT3 | F | P | P | PB | P | P | F | F | F | F | F | F | F | F | F | F |
| DAT4 | P | P | PB | P | P | F | F | F | F | F | F | F | F | F | F | F |
| DAT5 | P | PB | P | F | F | F | F | F | F | F | F | F | F | F | F | F |
| DAT6 | F | F | P | P | PB | P | P | F | F | F | F | F | F | F | F | F |
| DAT7 | F | F | P | P | PB | P | P | F | F | F | F | F | F | F | F | F |

FIG. 11

| Bit | Device Type |
|---|---|
| 7 | DDR400 Dual Data Rate e·MMC @ 200 MHz - 1.2V I/O |
| 6 | DDR400 Dual Data Rate e·MMC @ 200 MHz - 1.8V I/O |
| 5 | HS200 Single Data Rate e·MMC @ 200 MHz - 1.2V I/O |
| 4 | HS200 Single Data Rate e·MMC @ 200 MHz - 1.8V I/O |
| 3 | High-Speed Dual Data Rate e·MMC @ 52 MHz - 1.2V I/O |
| 2 | High-Speed Dual Data Rate e·MMC @ 52 MHz - 1.8V or 3V I/O |
| 1 | High-Speed e·MMC @ 52 MHz - at rated device voltage(s) |
| 0 | High-Speed e·MMC @ 26 MHz - at rated device voltage(s) |

FIG. 12A

HS_TIMING(timing and driver strength)

| Bit 7 | Bit 6 | Bit 5 | Bit 4 | Bit 3 | Bit 2 | Bit 1 | Bit 0 |
|---|---|---|---|---|---|---|---|
| Selected Driver Strength | | | | Timing Interface | | | |

FIG. 12B

HS_TIMING values

| Value | Timing Interface | Remarks |
|---|---|---|
| 0x0 | Selecting backwards compatibility interface timing | |
| 0x1 | High Speed | |
| 0x2 | HS200 | |
| 0x3 | DDR400 | |

Note1: t_ISU and t_IH are measured at V_IL (max.) and V_IH (min.).
Note2: V_IH denote V_IH (min.) and V_IL denotes V_IL (max.).

FIG. 14

| Parameter | Symbol | Min | Max. | Unit | Remark |
|---|---|---|---|---|---|
| Input CLK | | | | | |
| Cycle time data transfer mode | $t_{PERIOD}$ | 5 | — | ns | 200MHz(Max.), between rising edges |
| Clock high time | $t_{WH}$ | 1.5 | | ns | $C_{BGA} \leq 6pF$ |
| Clock low time | $t_{WL}$ | 1.5 | | ns | $C_{BGA} \leq 6pF$ |
| Clock rising/falling time | $t_{TLH}, t_{THL}$ | — | $0.2 \cdot t_{PERIOD}$ | ns | $t_{TLH}, t_{THL} < 1ns(max.)$ at 200MHz, $C_{BGA} = 6pF$, The absolute maximum value of $t_{TLH}, t_{THL}$ is 10ns regardless of clock frequency. |
| Clock duty cycle | | 47.5 | 52.5 | % | Includes jitter, phase noise |
| Input DAT (referenced to CLK) | | | | | |
| 333MHz  Input set-up time | $t_{ISUddr}$ | 0.5 | | ns | $4pF \leq C_{BGA} \leq 6pF$ |
| 333MHz  Input hold time | $t_{IHddr}$ | 0.5 | | ns | $4pF \leq C_{BGA} \leq 6pF$ |
| 400MHz  Input set-up time | $t_{ISUddr}$ | 0.4 | | ns | $4pF \leq C_{BGA} \leq 6pF$ |
| 400MHz  Input hold time | $t_{IHddr}$ | 0.4 | | ns | $4pF \leq C_{BGA} \leq 6pF$ |

Note: $V_{OH}$ denotes $V_{OH}$(min.) and $V_{OL}$ denotes $V_{OL}$(max.).

FIG. 16

| Parameter | Symbol | Min | Max. | Unit | Remark |
|---|---|---|---|---|---|
| Output CLK | | | | | |
| Cycle time data transfer mode | tPERIOD | 5 | – | ns | 200MHz(Max.), between rising edges |
| RCLK high time | tRWH | 1.5 | | ns | $C_{BGA} \leq 6pF$ |
| RCLK low time | tRWL | 1.5 | | ns | $C_{BGA} \leq 6pF$ |
| Clock rising/falling time | tTLH, tTHL | – | $0.2 \cdot t_{PERIOD}$ | ns | tTLH, tTHL<1ns(max.)at 200MHz, $C_{BGA}$=6pF, The absolute maximum value of tTLH, tTHL is 10ns regardless of clock frequency. |
| Clock duty cycle | | 45 | 55 | % | Includes jitter, phase noise |
| Output DAT (referenced to RCLK) | | | | | |
| 333MHz | Output hold skew | tRQ | 0.5 | | ns | $4pF \leq C_{BGA} \leq 6pF$ |
| | Output hold time | tRQH | 0.5 | | ns | $4pF \leq C_{BGA} \leq 6pF$ |
| 400MHz | Output hold skew | tRQ | 0.4 | | ns | $4pF \leq C_{BGA} \leq 6pF$ |
| | Output hold time | tRQH | 0.4 | | ns | $4pF \leq C_{BGA} \leq 6pF$ |

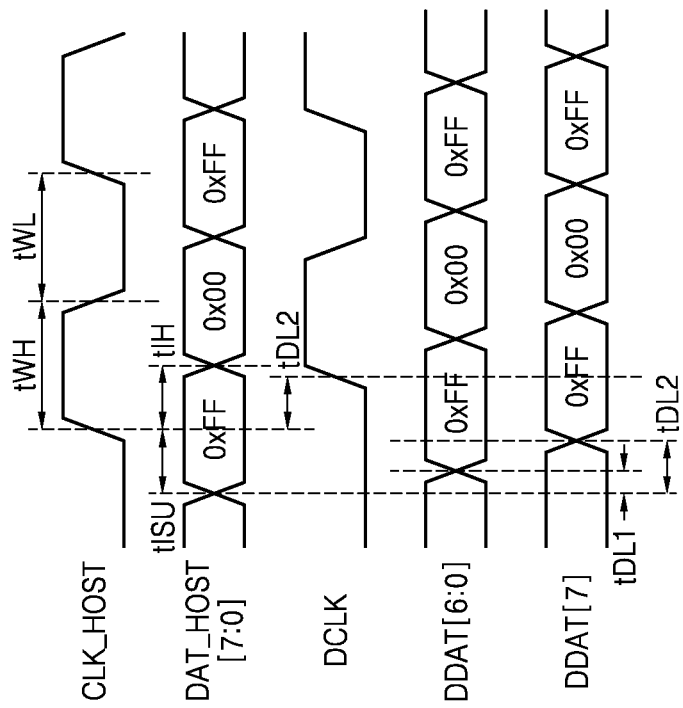
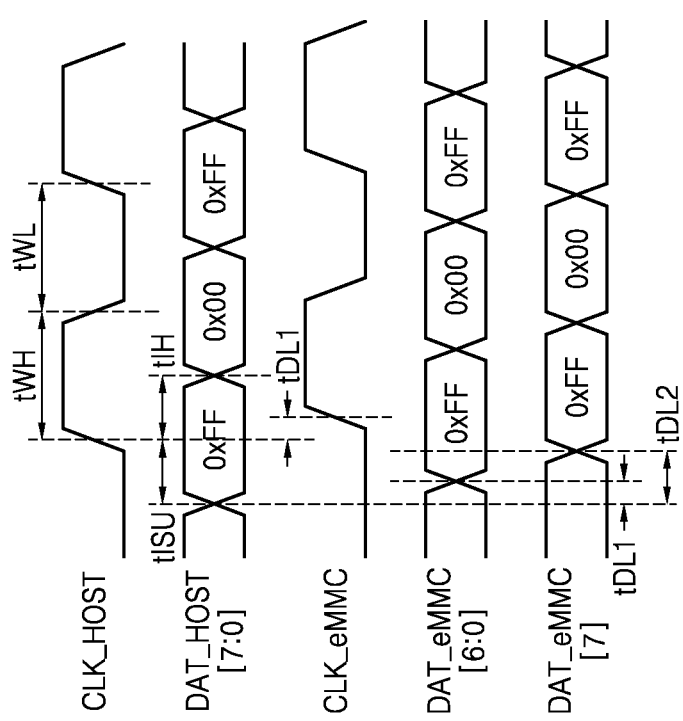
FIG. 21A
FIG. 21B

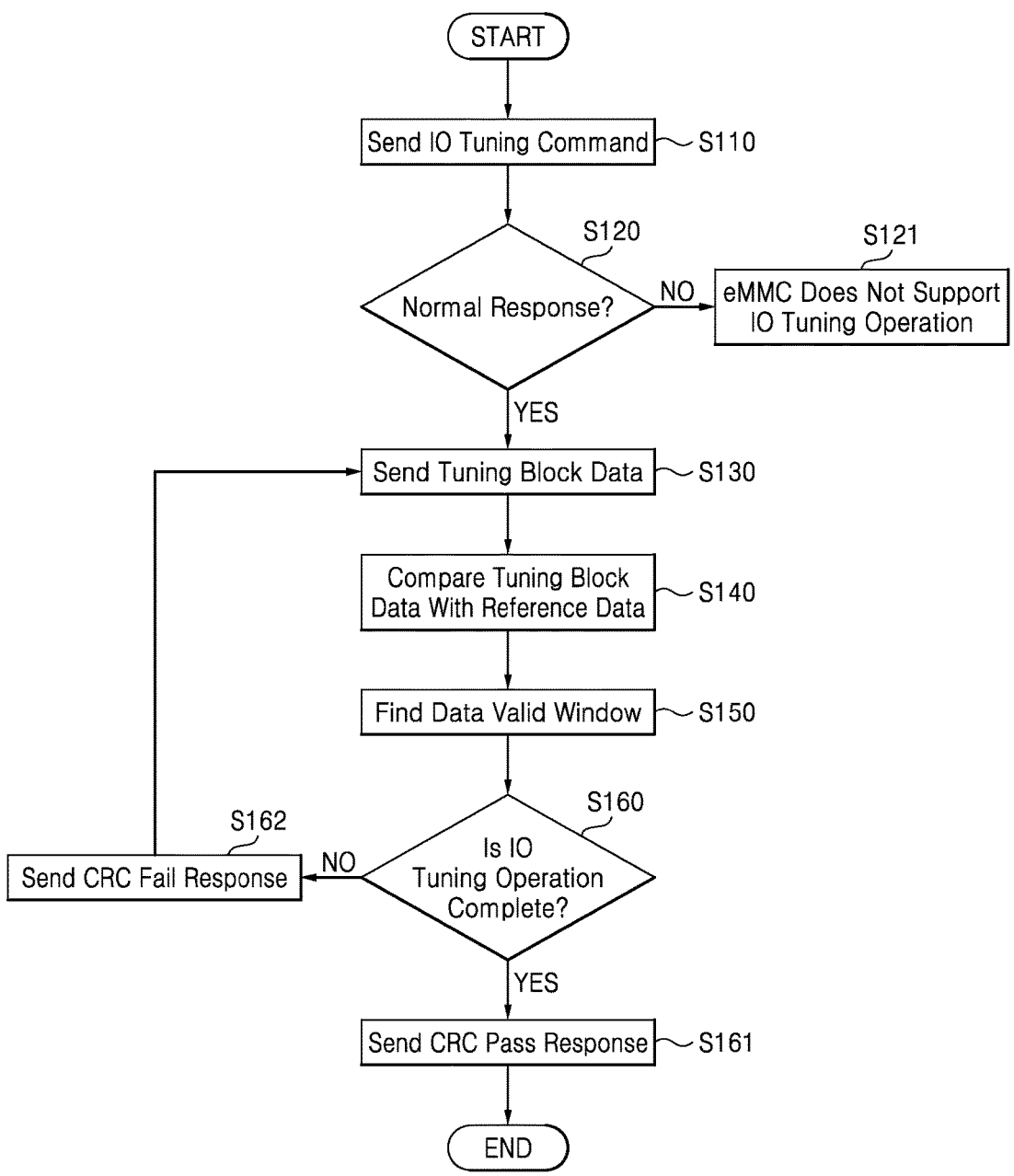

EMBEDDED MULTIMEDIA CARD (EMMC), HOST CONTROLLING EMMC, AND METHOD OPERATING EMMC SYSTEM INCLUDING THE USE OF A SWITCH COMMAND DEFINING AN ADJUSTMENT DELAY FOR A DATA SIGNAL

CROSS-REFERENCE TO RELATED APPLICATIONS

This application claims priority under 35 U.S.C. §119(a) from Korean Patent Application No. 10-2012-0102469 filed Sep. 14, 2012, and Korean Patent Application No. 10-2012-0102470 filed Sep. 14, 2012, the collective subject matter of which is hereby incorporated by reference.

BACKGROUND

The inventive concept relates generally to embedded Multimedia Cards (eMMCs), eMMC systems including an EMMC and a host, and methods of operating eMMC systems. More particularly, the inventive concept relates to eMMCs, eMMC systems and methods of eMMC operation that are capable of securing an improved data valid window for data received by a host by directly correcting input timing for the data signals provided by the eMMC.

The so-called multimedia card (MMC) is a flash memory card standard. The eMMC is an embedded MMC standard defined by the Joint Electron Devices Engineering Council (JEDEC). In general configuration and application eMMCs are designed to be inserted (or "embedded") in conjunction with a host within mobile communication devices such as smart phones. Conventionally, the eMMC communicates data signals, control signals, commands, clock(s) and/or power signals with the connected host in accordance with a standardize ten (10) signal line bus.

SUMMARY

One embodiment of the inventive concept is directed to an embedded multimedia card (eMMC), including (eMMC), including a clock channel receiving a clock signal output from a host, data channels receiving data signals from the host, and a command channel, in response to delay offset values, receiving a switch command CMD6 including the delay offset values from the host to adjust a delay of at least one of the data signals received. The eMMC further includes an EXT_CSD register.

The delay offset values may be stored in a VENDOR_SPECIFIC_FIELD field of the EXT_CSD register.

The command channel may receive a Get Tuning Block command from the host to determine whether the data signals are valid. Each of the data channels receives each data block from the host according to the Get Tuning Block command, and transmits each CRC status token, included in the each data block and indicating whether the each data block is valid, to the host.

The command channel may repeatedly receive the SWITCH command CMD6 including different delay offset values from the host until transmitting the each CRC status token, indicating the each data block is all invalid, to the host.

The eMMC may further include a delay circuit so as to delay at least one of the data signals, which are received, according to the delay offset values. The delay circuit includes buffers outputting delay signals each having a different delay by delaying at least one of the data signals, and a selector selecting one of the delay signals in response to one of the delay offset values.

Another embodiment of the inventive concept is directed to a host controlling an embedded Multimedia Card (eMMC), including a clock channel transmitting a clock signal to the eMMC, data channels transmitting data signals to the eMMC, and a command channel transmitting a SWITCH command CMD6 including delay offset values to the eMMC so as to adjust a delay of at least one of data signals received by the eMMC.

The command channel may transmit a Get Tuning Block command to the eMMC so as to determine whether the data signals are valid. Each of the data channels transmits each data block to the eMMC according to the Get Tuning Block command, and receives each CRC status token, included in the each data block and indicating whether the each data block is valid, from the eMMC.

The command channel may repeatedly transmit the SWITCH command CMD6 including different delay offset values from the eMMC until receiving the each CRC status token, indicating the each data block is all invalid, from the eMMC.

Another embodiment of the inventive concept is directed to a method for operating an eMMC system including an embedded Multimedia Card(eMMC) and a host, including transmitting, by the host, a SWITCH command CMD6 including delay offset values to the eMMC so as to adjust a delay of at least one of the data signals received by the eMMC, and transmitting, by the host, a Get Tuning Block command to the eMMC so as to determine whether the data signals are valid.

The method for operating the eMMC system further includes receiving, by the host, a response from the eMMC in response to the Get Tuning Block command, transmitting, by the host, data blocks to the eMMC in response to the response, and transmitting, by the eMMC, each CRC status token, included in the data block and indicating whether the data signals are valid, to the host.

The method for operating the eMMC system further includes repeatedly transmitting the SWITCH command CMD6, including different offset values, and the Get Tuning Block command to the eMMC until receiving the each CRC status token indicating the data signals are all invalid.

The method for operating the eMMC system further includes calculating the number of each of the data signals which are valid according to the different delay offset values, and transmitting the SWITCH command CMD6 to the eMMC so as to set a maximum delay offset value by using the number of each of the data signals which are valid.

Another embodiment of the inventive concept is directed to an embedded multimedia card(eMMC), including a clock delay circuit adjusting a delay of a clock signal, input through a clock channel, based on a clock adjusting code, and data delay circuits each adjusting each delay of data signals, input through data channels, based on each of data adjusting codes.

According to certain embodiments, the eMMC further includes a central processing unit(CPU) determining the clock adjusting code and the data adjusting codes, and programmable memories storing the clock adjusting code and the data adjusting codes determined by the CPU. According to another embodiment, the eMMC further includes latch circuits each latching each output signal of the data delay circuits based on an output signal of the clock delay circuit, and a code generation circuit comparing reference data signals with output data signals of the latch circuits and generating the clock adjusting code and the data adjusting codes based on a result of the comparison. The code generation circuit becomes enabled only during an IO tuning process.

The code generation circuit includes a memory storing the output data signals and the reference data signals, a data comparison circuit comparing between the output data signals and the reference data signals output from the memory and outputting comparison signals, a CPU generating the clock adjusting code and the data adjusting codes based on the comparison signals, and programmable memories storing the clock adjusting code and the data adjusting codes output from the CPU.

When the eMMC is initialized, after the eMMC is switched to the HS200 mode, or after the eMMC is switched to the DDR400 mode, the clock adjusting code and the data adjusting codes, which are stored in the memories, are initialized.

The clock adjusting circuit includes first delay circuits each generating a delay clock signal having a different delay based on the clock signal, and a first selection circuit outputting one of output signals of the first delay circuits based on the clock adjusting code.

Each of the data delay circuits includes second delay circuits each generating a delay data signal having a different delay based on a corresponding data signal among the data signals, and a second selection circuit outputting one of output signals of the second delay circuits based on a corresponding data adjusting code among the data adjusting codes.

Another embodiment of the inventive concept is directed to a method for operating a host controlling an operation of an embedded multimedia card (eMMC), including transmitting an IO tuning instruction to the eMMC, receiving a response to the IO tuning instruction from the eMMC, and transmitting tuning block data signals synchronized with a clock signal to the eMMC based on the response.

The method for operating a host further includes transmitting, until a CRC pass response is received from the eMMC, the tuning block data signals synchronized with the clock signal to the eMMC whenever a CRC fail response is received from the eMMC.

One embodiment of the inventive concept is directed to a method for operating an embedded multimedia card (eMMC), including adjusting a delay of a clock pass and each delay of data passes using a result of comparing reference data signals with tuning block data signals received from a host during an IO tuning operation, and latching each of data signals output through each of the delay-adjusted data passes in response to a clock signal output through the delay-adjusted clock pass during a data write operation. The adjusting of a delay is performed after the eMMC is switched to the HS200 mode or the DDR400 mode.

One embodiment of the inventive concept is directed to a method for operating an embedded multimedia card (eMMC), including transmitting a response to the host based on an IO tuning command received from a host, receiving a clock signal and tuning block data signals from the host, restoring the tuning block data signals based on the clock signal, comparing reference data signals with restored tuning block data signals, and transmitting a CRC response, indicating whether an IO tuning process is completed, to the host based on a result of the comparison.

The method for operating the eMMC further includes determining adjusting codes, adjusting each delay of the clock signal and the tuning block data signals using each of the adjusting codes, restoring each of the delay-adjusted tuning block data signals in response to the delay-adjusted clock signal, and comparing the reference data signals with the restored tuning block data signals to generate the CRC response.

When the eMMC is initialized, after the eMMC is switched to the HS200 mode, or after the eMMC is switched to the DDR400 mode, each of the adjusting codes is initialized to an initial value.

According to certain embodiments, the adjusting codes are determined based on a result of comparing the reference data signals with the restored tuning block data signals. According to another embodiment of the inventive concept, the adjusting codes are determined based on a result of comparing the reference data signals with the delay-adjusted tuning block data signals.

BRIEF DESCRIPTION OF THE DRAWINGS

FIG. 9 is a table is listing certain delay offset values that may be stored in a VENDOR-SPECIFIC FIELD of an EXT-CSD register according to embodiments of the inventive concept;

FIG. 10 is a table illustrating exemplary relationships between valid/invalid data signals and delay offset values;

FIG. 11 is a table listing exemplary entries for a device type field according to embodiments of the inventive concept;

FIG. 12, inclusive of FIGS. 12A and 12B, illustrate HS-TIMING and HS-TIMING values according to certain embodiments of the inventive concept;

FIG. 14 is a table listing parameters related to the DDR 400 input timing diagram of FIG. 13;

FIG. 16 is a table listing parameters related to the DDR 400 output timing diagram of FIG. 15;

FIGS. 21A, 21B, 22A, 22B, 23A and 23B are respective timing diagrams that serve to further illustrate certain I/O tuning processes that may be performed in the eMMC system of FIG. 18;

FIG. 24 is a flowchart summarizing one possible method of performing an I/O tuning process for the eMMC system of FIG. 18;

DETAILED DESCRIPTION

Figure 1:
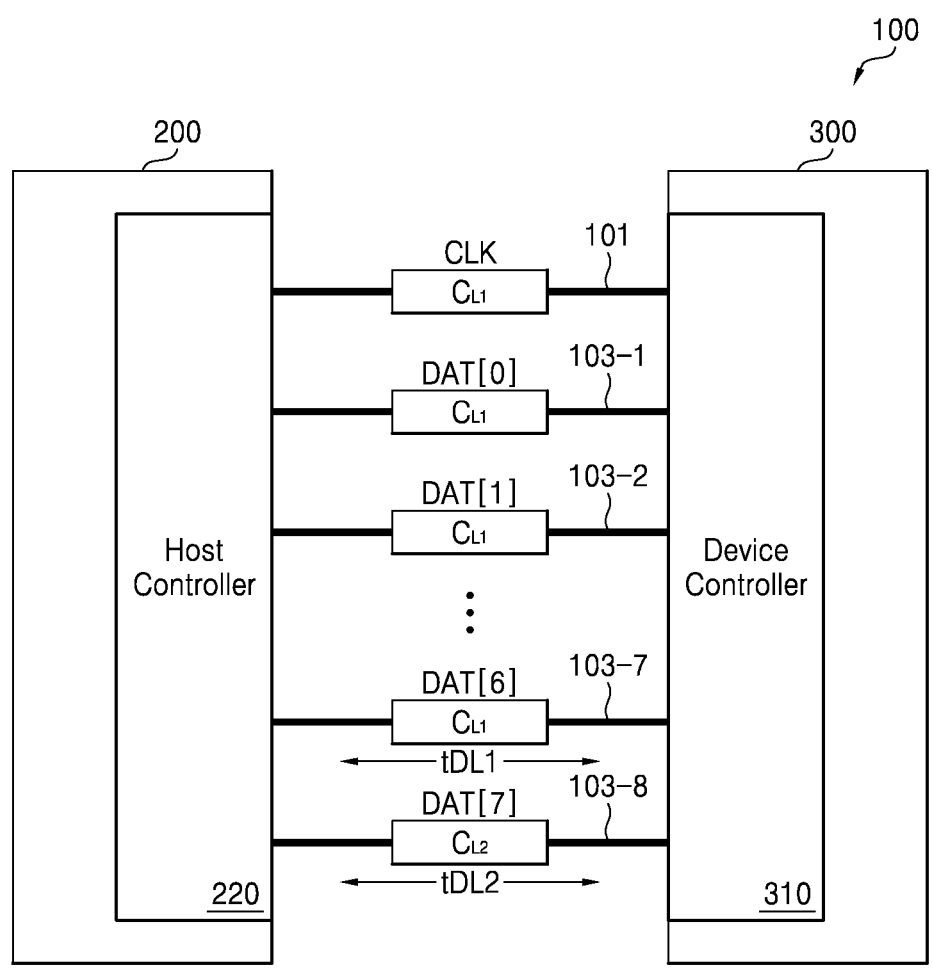
FIG. 1 is a block diagram of an eMMC system including an embedded Multimedia Card (eMMC) and a host according to certain embodiments of the inventive concept.

Certain embodiments the inventive concept will now be described in some additional detail with reference to the accompanying drawings. However, the inventive concept may be embodied in many different forms and should not be construed as being limited to only the illustrated embodiments. Rather, the illustrated embodiments are provided so that this disclosure will be thorough and complete, and will fully convey the scope of the inventive concept to those skilled in the art. Throughout the written description and drawings, like reference numbers and labels will be used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Those skilled in the art will understand that various JEDEC standards are available that characterize and/or define the structure, constitution and/or operating conditions of eMMCs. These standards may be readily obtained and consulted by recourse to the JEDEC Solid State Technology Association For example, the embedded multimedia card (eMMC) electrical standard, version 4.51 published June 2012 (i.e., JESD84-B451) contains many terms and technical definitions that are useful to an understanding of the inventive concept.

Various embodiments of the inventive concept may include at least one "additional" signal line or signal wire (hereafter, simply "line") having a specific purpose. This additional line will be additive to the standard 10-wire configuration(s) specified by JEDEC. The provision of an additional line within certain embodiments of the inventive concept increases noise immunity and improves transmission speed for data communicated between a host and a device during a data read operation while operating in a dual data rate (DDR) mode. Those skilled in the art will understand the general technical concepts and design options involved in providing a DDR mode of operation—specifically including so-called "DDR 400". In this regard, pending U.S. Patent Application [claiming priority to Korean Patent Application No. 10-2012-0102467 filed on Sep. 14, 2012] is hereby incorporated by reference.

Within various embodiments of the inventive concept, the term "channel" is used to denote a signal path enabling the transmission of one or more electrical signal(s) (e.g., a voltage). As will be understood by those skilled in the art, a channel may include one or more of; circuits acting upon the one or more electrical signal(s), a host pad (and/or pin), an eMMC pad (and/or pin), a line (or collection of lines), a driver—specifically including but not limited to certain differential amplifiers, and a receiver—specifically including but not limited to certain differential amplifiers.

Embodiments of the inventive concept relate to eMMCs, eMMC systems and methods of operation for eMMC systems that are capable of performing an input/output (I/O) tuning process that searches for an optimal sampling point in a data valid window for data signals communicating write data from a host to an eMMC during a write operation.

FIG. 1 is a block diagram of an eMMC system including an embedded Multimedia Card (eMMC) and a host according to certain embodiments of the inventive concept. Referring to FIG. 1, an eMMC system 100 generally comprises a host 200 and a device (an eMMC) 300.

The host 200 may be used to control data processing operations (e.g., read, write and/or erase operation) performed by the eMMC 300. Such data processing operations may be performed using single data rate (SDR) or double data rate DDR signaling techniques. The host 200 may be a data processing device such as a central processing unit (CPU), a processor, a microprocessor or an application processor. Further, the data processing device may be embedded, configured within, or embodied in an electronic device such as a personal computer (PC), a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), a MP3 player, a handheld game console, or an e-book.

The host 200 includes a host controller 220 generally configured to control operation of the host 200.

The eMMC 300 may be electrically connected within the electronic device to the host 200 (and/or to the constituent electronic device) via a variety of conventionally understood connections, including for example, pads, pins, bus(es), signal lines, channel, etc. In FIG. 1, the eMMC 300 comprises a device (eMMC) controller 310 that controls the overall operation of the eMMC 300.

In the context of at least one embodiment, certain functionality provided by the of the host controller 220 and eMMC controller 310 will be described in relation to FIG. 3. Of note, only a clock line 101 and a plurality of data lines, including data lines 103-1 through 103-8, are shown in FIG. 1. As will be appreciated from the following written description of embodiments, other signals lines may be provided between the host 200 and eMMC 300. However, in the embodiment of FIG. 1, the clock bus 101 may be used to communicate a clock signal ("clock") CLK, and the data lines 103-1 to 103-8 may be used to respectively communicate one of a plurality of "write signals" DAT[0] to DAT[7] to the eMMC 300 during a write operation, or to respectively communicate one of a plurality of "read signals" DAT[0] to DAT[7] to the host 200 during a read operation.

Figure 2:
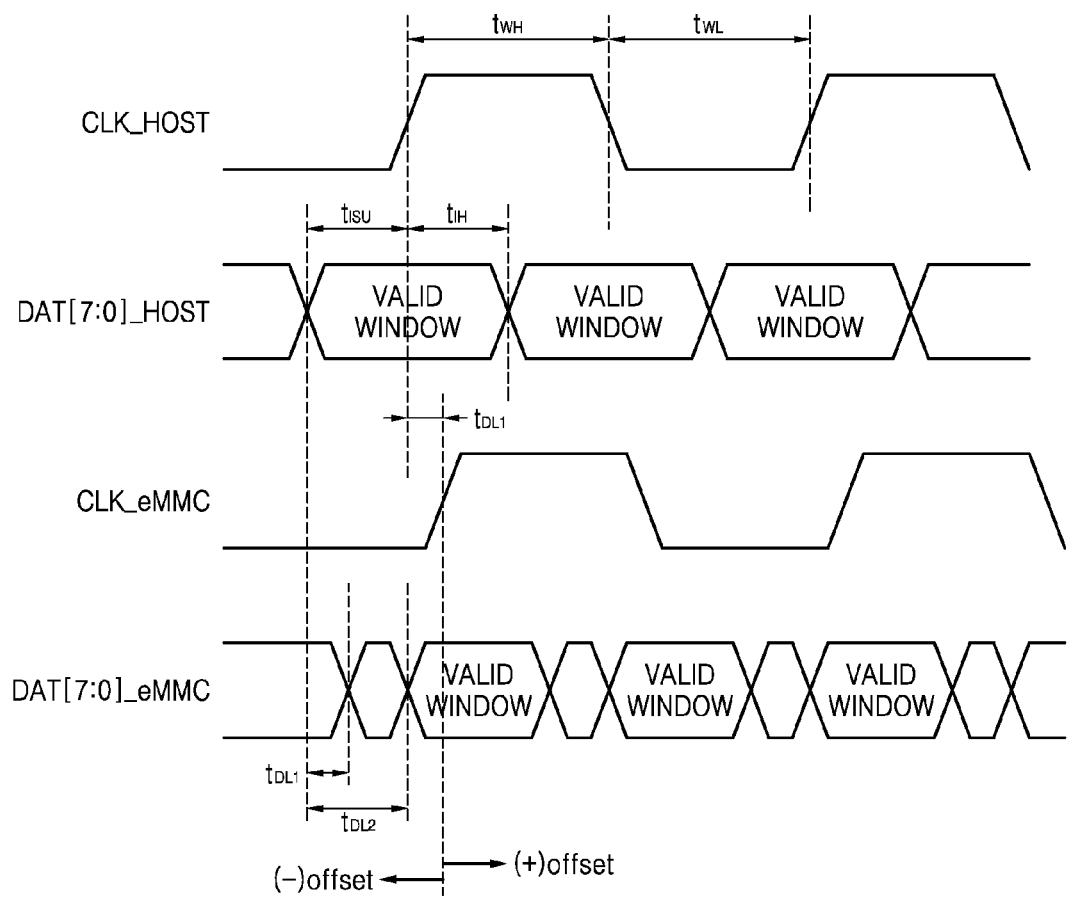
FIG. 2 is a timing diagram illustrating signals communicated between the eMMC and host in the eMMC system of FIG. 1.

FIG. 2 is a timing diagram that illustrates certain signals that exist during write operations performed by the eMMC system 100 of FIG. 1. The illustrated signals include: (1) a "host clock" (CLK_HOST) as communicated by the host 200 to the eMMC 300 via the clock line; (2) a "host write signal" (DAT[7:0]_HOST) as communicated by the host 200 to the eMMC 300 via one data line among the plurality of data lines; (3) an "eMMC clock" (CLK_eMMC) as received by the eMMC 300 from host 200; and (4) an "eMMC write signal" (DAT[7:0]_eMMC) as received by the eMMC 300 from the host 200 via the one data line.

With regard to the host clock, $t_{WH}$ denotes a host clock high level period, and $t_{WL}$ denotes a host clock low level period. With regard to the host write signal, $t_{ISU}$ denotes an input set-up time, and $t_{1H}$ denotes an input hold time.

However, referring to FIGS. 1 and 2, the clock line 101 and one or more of the plurality of data lines 103-1 to 103-8 may be characterized by a different line capacitance (e.g., $C_{L1}$ verses $C_{L2}$). Thus, when the host 200 communicates the host write signals to the eMMC during a write operation, the eMMC 300 will receive the respective host write signals in relation to one or more signal propagation or time delay(s) (e.g., $t_{DL1}$ or $t_{DL2}$) that are a function of line capacitance. For example, in the illustrated embodiment of FIG. 2, a first time delay $t_{DL1}$ and a second time delay $t_{DL2}$ are different. Thus, a first host write signal delayed by the first time delay $t_{DL1}$ associated with a first data line will be received in the eMMC at a different time than a second host write signal delayed by the second time delay $t_{DL2}$ associated with a second data line. The resulting timing skew may cause a reduction in the an input setup time $t_{ISU}$. Accordingly, a "data valid window" for an eMMC write signal (DAT[7:0]_eMMC) corresponding to a relatively delayed host write signal (DAT[7:0]_HOST) will be attenuated. Such attenuated data valid windows are particular troublesome when the eMMC system 100 operates at a relatively high clock speed (e.g., such as when the eMMC system 100 is operated in the DDR 400 mode).

In order to secure a maximum the data valid data, an eMMC according to embodiments of the inventive concept will apply a "delay adjustment" to eMMC write signal(s) (DAT[7:0]_eMMC). Delay adjustments applied to respective eMMC write signal(s) may take the form of a positive timing offset or a negative timing offset relative to a reference point in time (e.g., a clock edge detection). Certain methods of providing adjustments delay(s) to eMMC write signals and/or methods of providing eMMC write signal timing offsets will be described hereafter.

Figure 3:
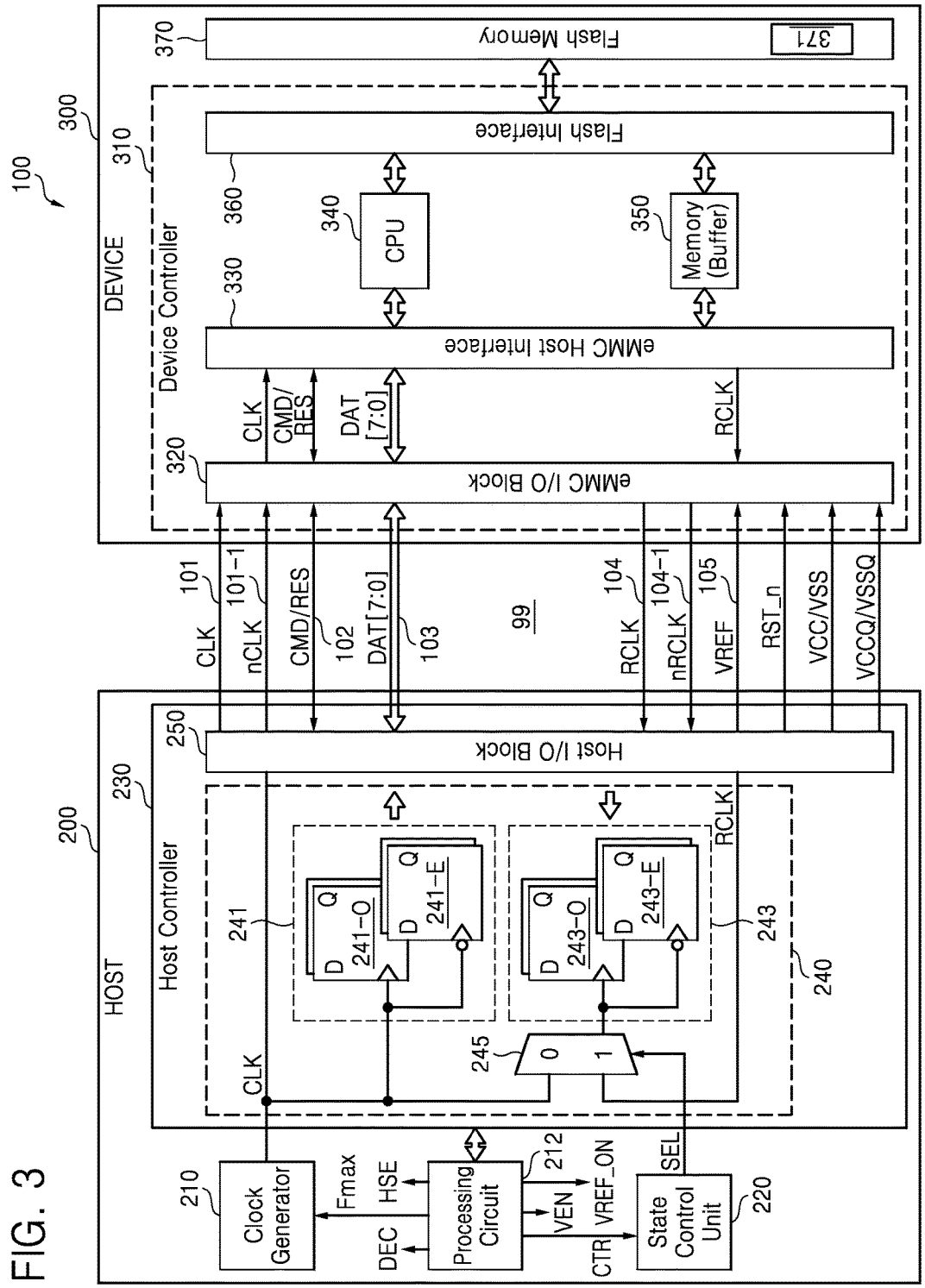
FIG. 3 is a block diagram further illustrating in one example the eMMC system of FIG. 1.

FIG. 3 is a block diagram further illustrating the eMMC system 100 of FIG. 1. Referring to FIGS. 1, 2 and 3, the host 200 comprises a clock generator 210, a processing circuit 212, a state control unit 220, and a host controller 230.

The clock generator 210 may be used to generate a clock CLK (or host clock CLK) that is used by various circuits in the host 200 and eMMC 300. In certain embodiments of the inventive concept, the clock CLK will be provided at a frequency defined by a maximum operation frequency control signal (Fmax). For example, the clock generator 210 may be embodied in a phase locked loop (PLL) circuit. The processing circuit 212 may be used to generate various control signals, such as DEC, Fmax, HSE, CTR, VEN and VREF_ON according to an operating mode of the eMMC system 100, a current command CMD communicated by the host 200, and/or a current response RES communicated by the eMMC 300. Here, DEC is a host differential clock enable signal, HSE is a second selection signal, CTR is a state control signal, VEN is a host differential amplification enable signal, and VREF_ON is a host reference voltage enable signal.

The processing circuit 212 may implemented in hardware, firmware and/or software and may be used to generate a command CMD, interpret a received response RES, interpret eMMC data stored in an Extended Card Specific Device register (EXT_CSD register) 371 of the eMMC 300, and/or control data processing operation(s). Thus, the processing circuit 212 may be used to control the operation of and inter-operation of the clock generator 210, state control unit 220, and host controller 230. The state control unit 220 may generate a first selection signal SEL in response to the state control signal CTR.

The host controller 230 illustrated in FIG. 1 comprises a data input/output (I/O) circuit 240 and a host I/O block 250. During write operations, the data I/O circuit 240 communicates "write data" to be written in a flash memory 370 of the eMMC 300 to the host I/O block 250 in the form of "write signals" in response to the clock CLK. During read operations, the I/O circuit 240 receives "read data" retrieved from the flash memory 370 via the host I/O block 250 in response to and "output clock" being one of the clock CLK or a return clock RCLK as indicated by the selection circuit 245.

The data I/O circuit 240 of FIG. 3 includes a write latch circuit 241, a read latch circuit 243, and a first selection circuit 245. The write latch circuit 241 includes first write latches 241-O and second write latches 241-E. In response to a rising edge of the clock CLK, the first write latches 241-O may be used to latch odd numbered data bits among the write data, and in response to a falling edge of the clock CLK, the second write latches 241-E may be used to latch even numbered data bits among the write data.

A read latch circuit 243 includes first read latches 243-O and second read latches 243-E. In response to a rising edge of the output clock, the first read latches 243-O may be used to latch odd numbered data bits among the read data, and in response to a falling edge of the output clock, the second read latches 243-E may be used to latch even numbered data bits among the read data.

In certain embodiments, the first selection circuit 245 may be embodied by a multiplexer, wherein the multiplexer may be used to communicate the clock CLK to the read latch circuit 243 in response to a first level ("low") first selection signal SEL or the return clock RCLK to the read latch circuit 243 in response to a second level ("high") first selection signal SEL.

In the illustrated embodiment of FIG. 3, the host 200 includes the state control unit 220 and first selection circuit 245. However, this need not always ne the case. In other embodiments, the host 200 will not include the state control unit 220 and/or first selection circuit 245. In such embodiments, for example, the return clock RCLK may be directly applied to the read latch circuit 243. That is, the first read latches 243-O may be used to latch odd numbered data bits among the read data in response to a rising edge of the return clock RCLK, and the second read latches 243-E may be used to latch even numbered data bits among the read data.

The eMMC bus 99 illustrated in FIG. 3 may further include in addition to the unidirectional clock line 101, the bidirectional command/response line 102 and bidirectional data bus 107; a unidirectional complementary clock line 101-1 that communicates a complementary clock nCLK, a unidirectional return clock line 104 that communicates the return clock RCLK to the host 200, and a complementary return clock bus 104-1 that communicates a complementary return clock nRCLK to the host 200.

Thus, in certain embodiments of the inventive concept, the eMMC system 100 may use at least one additional signal line to communicate (e.g.,) the return clock RCLK and the complementary return clock nRCLK to improve data transmission speed during read operations and increase overall data throughput.

Also the host 200 may communicate a hardware reset signal RST-n to the eMMC 300 via a reset line RST_n, one or more I/O operating voltages (e.g., VCCQ/VSSQ and/or core operating voltages VCC/VSS) via one or more an I/O power line(s). For example, a driver including a differential amplifier according to certain embodiments of the inventive concept, and a receiver including a differential amplifier according to certain embodiments of the inventive concept may be included in the I/O blocks 250 and 320 and may operate in response to the I/O operating voltages VCCQ and VSSQ.

Still further the eMMC system 100 of FIG. 3 may include a reference voltage line 105 that communicates a reference voltage VREF (e.g., a reference voltage derived from the I/O operating voltages VCCQ and VSSQ) from the host 200 to the eMMC 300, or from the eMMC 300 to the host 200.

Certain ones of these possible "additional signal lines" (e.g., 101-1, 104, 104-1, 105 and power lines for VCC/VSS or VCCQ/VSSQ) will be referenced in the description of embodiments of the inventive concept that follows.

The eMMC 300 of FIG. 3 comprises a device (eMMC) controller 310 and flash memory 370. The eMMC controller 310 may be used to control data communications between the host 200 and the flash memory 370. The eMMC controller 310 includes the eMMC I/O block 320, an eMMC host interface 330, a CPU 340, a buffer memory 350, and a flash interface 360.

The eMMC host interface 330 receives the clock CLK and command CMD via the eMMC I/O block 320, generates the return clock RCLK based on the clock CLK, transmits the return clock RCLK to the eMMC I/O block 320, interprets the command CMD, generates a response RES by interpreting the command CMD, and transmits the response RES as well as read data, where required, to the eMMC I/O block 320.

During write operations, the eMMC host interface 330 temporarily stores read data received via the eMMC I/O block 320 in the buffer memory 350 using the clock CLK and under the control of the CPU 340. Here, the flash interface 360 receives the write data temporarily stored in the buffer memory 350, and program the write data in the flash memory 370 under the control of the CPU 340.

During read operations, the flash interface 360 stores read data retrieved from the flash memory 370 in the buffer memory 350 under the control of the CPU 340. Here, the eMMC host interface 330 receives read data stored in the buffer memory 350 using the clock CLK and transmits the read data via the eMMC I/O block 320 under the control of the CPU 340.

Thus, the CPU 340 may be used to control the operation of interfaces 330 and 360, and generally control the operation of the eMMC 300. The buffer memory 350 temporarily stores read/write data exchanged between the interfaces 330 and 360, and may be embodied in a volatile memory. The flash memory 370 stores data, and the flash interface 360 may be embodied in a NAND flash interface when the flash memory 370 is embodied in the NAND flash memory. The flash memory 370 includes the EXT_CSD register 371 that may be used to store information characterizing eMMC properties and operating modes.

Figure 4:
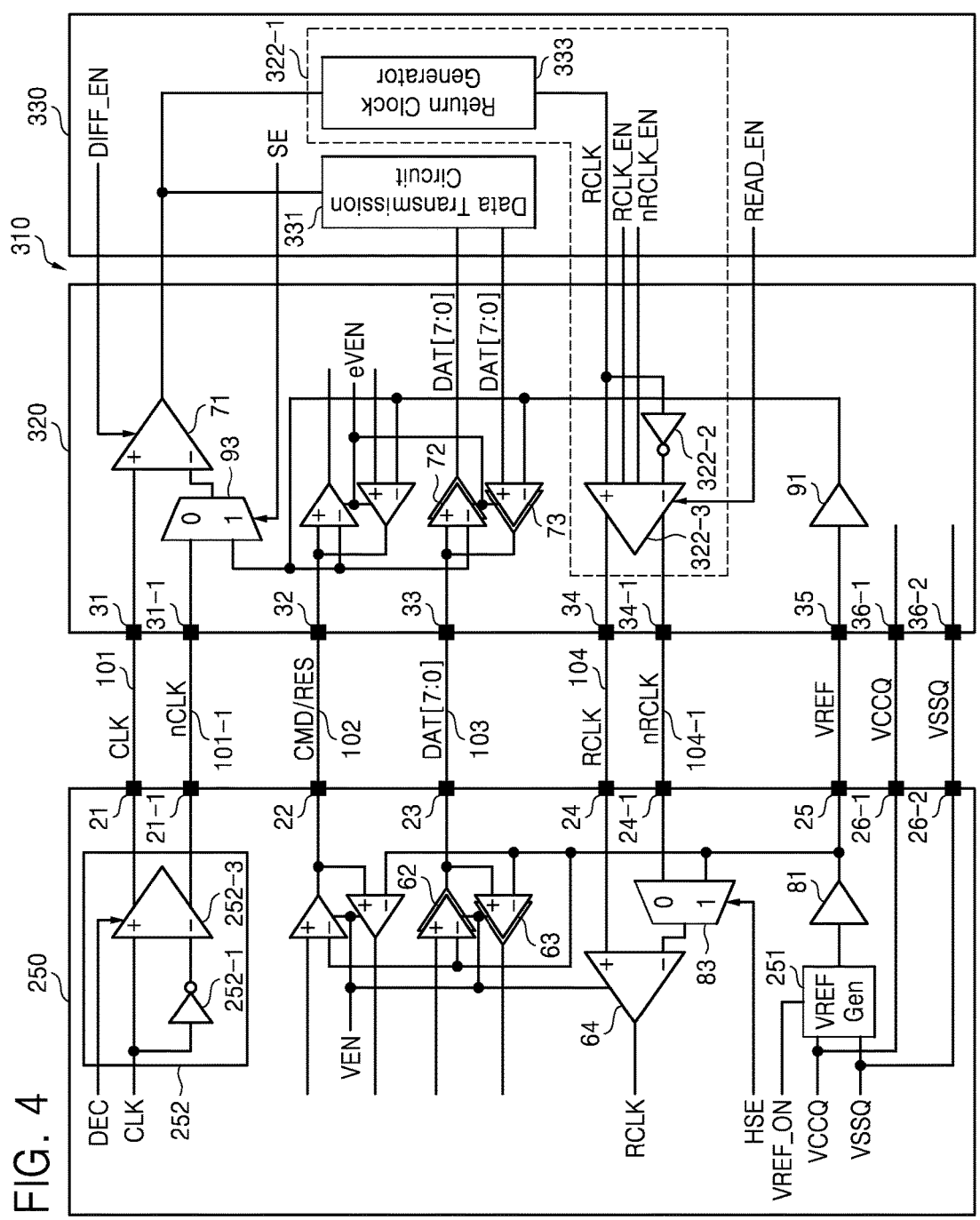
FIG. 4 is a circuit diagram further illustrating portions of the eMMC system of FIG. 1 including certain I/O blocks.

FIG. 4 is a circuit diagram illustrating a portion of the eMMC system 100 of FIG. 1 including the host I/O block 250, the eMMC I/O block 320 and the eMMC host interface 330.

Figure 5:
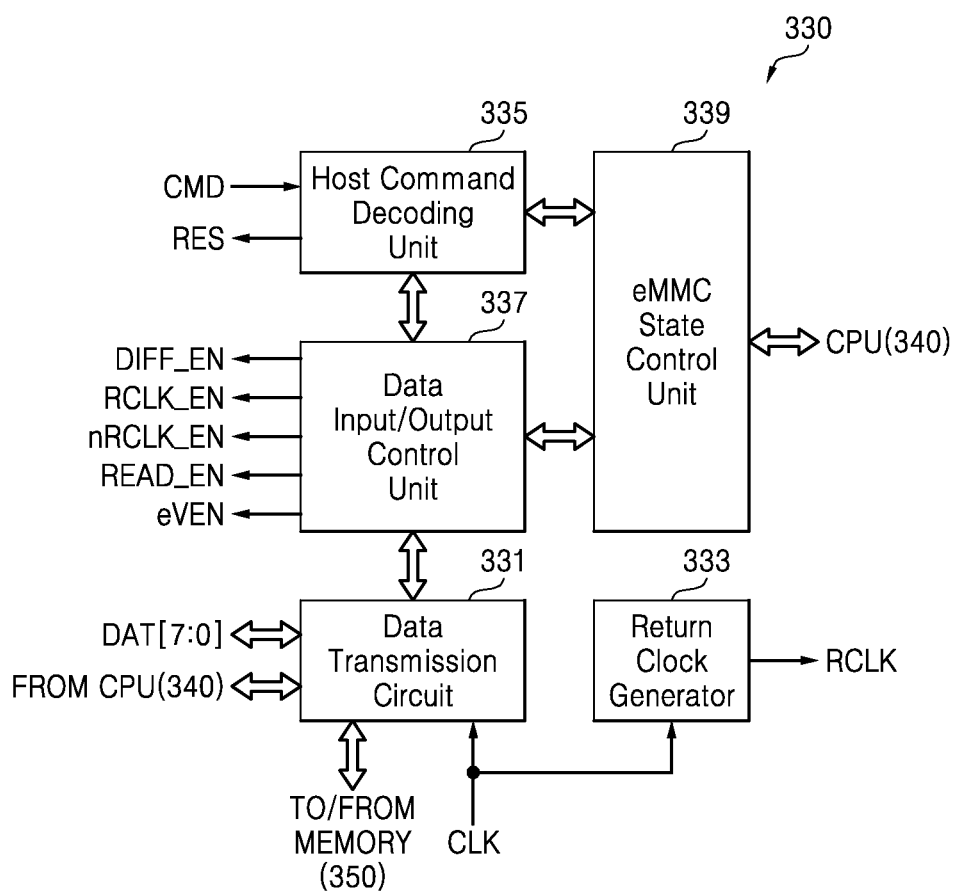
FIG. 5 is a block diagram further illustrating in one example the eMMC host interface 330 of FIG. 3.

FIG. 5 is a block diagram further illustrating the eMMC host interface 330 of FIGS. 3 and 4.

Referring to FIGS. 1, 3 and 4, the host I/O block 250 includes a differential clock generator 252, differential amplifiers 62, 63, and 64, a second selection circuit 83, a reference voltage generator 251, a driver 81, and host pads 21 to 26-2. The differential clock generator 252 outputs differential clocks CLK and nCLK complementarily toggling each other through host pads 21 and 21-1 based on an activated host differential clock enable signal DEC. However, the differential clock generator 252 outputs a toggling clock CLK and a complementary clock nCLK having a DC level, e.g., a ground level VSSQ, based on a deactivated host differential clock enable signal DEC.

The differential clock generator 252 includes an inverter 252-1 inverting a clock CLK, and a differential amplifier 252-3 amplifying a difference between the clock CLK and an output signal of the inverter 252-1. For example, the differential amplifier 252-3 generates differential clocks CLK and nCLK, or generates a clock CLK and a complementary clock nCLK having a DC level.

Differential amplifiers 62, 63 and 64 amplify a difference between a signal input to a positive input terminal and a signal input to a negative input terminal based on an activated host differential amplification enable signal VEN, respectively. However, each of the differential amplifiers amplifies a signal only input to a positive input terminal based on a deactivated host differential amplification enable signal VEN.

The second selection circuit 83 transmits one of a signal input through a host pad 24-1 and an output signal of the driver 81 to a negative input terminal of the differential amplifier 64 based on a second selection signals HSE.

The reference voltage generator 251 generates a reference voltage VREF by using the I/O operation voltages VCCQ and VSSQ in response to an activated host reference voltage enable signal VREF_ON. For example, the reference voltage generator 251 may be embodied in a voltage divider. The reference voltage VREF may be half the I/O operation voltage VCCQ. However, the reference voltage generator 251 becomes disabled in response to a deactivated host reference voltage enable signal VREF_ON. The reference voltage generator 251A may adjust a level of the reference voltage VREF.

The driver 81 drives the reference voltage VREF output from the reference voltage generator 251. The eMMC I/O block 320 includes eMMC pads 31 to 36-2, a third selection circuit 93, differential amplifiers 71, 72, and 73, a portion of a differential return clock generator 322-1, and a receiver 91.

The third selection circuit 93 transmits one of a signal, input through an eMMC pad 31-1, and the reference voltage VREF to a negative input terminal of a differential amplifier 71 based on a third selection signal SE. For example, when the third selection signal SE is at a first level, the third selection circuit 93 transmits a signal input through the eMMC pad 31-1 to a negative input terminal of the differential amplifier 71, and when the third selection signal SE is at a second level, the third selection circuit 93 transmits an output signal of the receiver 91 to a positive input terminal of the differential amplifier 71.

The differential amplifier 71 amplifies a difference between a signal input to a positive input terminal and a signal input to a negative input terminal in response to an activated eMMC differential clock enable signal DIFF_EN. However, the differential amplifier 71 amplifies a signal only input to a positive input terminal in response to a deactivated eMMC differential clock enable signal DIFF_EN.

Differential amplifiers 72 and 73 amplify a difference between a signal input to a positive input terminal and a signal input to a negative input terminal based on an activated eMMC differential amplification enable signal eVEN, respectively. However, each of the differential amplifiers 72 and 73 amplifies a signal only input to a positive input terminal based on a deactivated eMMC differential amplification enable signal eVEN.

The differential return clock generator 322-1 generates differential return clocks RCLK and nRCLK, i.e., a return clock RCLK and a complementary return clock nRCLK, based on an output signal CLK of the differential amplifier 71. The differential return clock generator 322-1 includes a return clock generator 333, an inverter 322-2, and a differential amplifier 322-3.

The return clock generator 333 generates a return clock RCLK based on an output signal CLK of the differential amplifier 71. The inverter 322-2 inverts the return clock RCLK.

During a data write operation, a read enable signal READ_EN becomes deactivated. Accordingly, during the data write operation, the differential amplifier 322-3 outputs differential return clocks RCLK and nRCLK each having a DC level through eMMC pads 34 and 34-1. The receiver 91 receives the reference voltage VREF.

As illustrated in FIG. 5, the eMMC host interface 330 includes a data transmission circuit 331, the return clock generator 333, a host command decoding unit 335, a data I/O control unit 337, and an eMMC state control unit 339. During read operations performed in the DDR 400 mode, the data transmission circuit 331 transmits read data signals DAT[7:0] to differential amplifiers 73 in response to the clock CLK output from the differential amplifier 71. The return clock generator 333 generates the return clock RCLK based on an output signal CLK of the differential amplifier 71.

Figure 6:
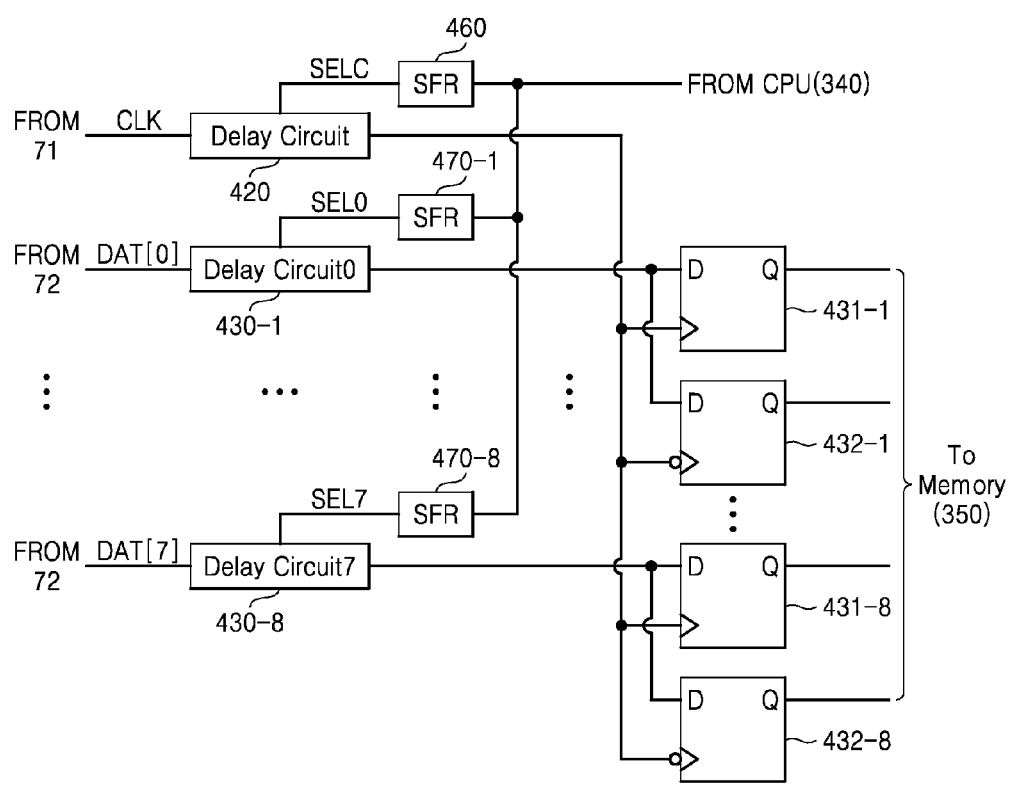
FIG. 6 is a circuit diagram further illustrating in one example portions of the eMMC system of FIG. 1 related to certain channels configured with delay circuits according to an embodiment of the inventive concept.

FIG. 6 is a circuit diagram further illustrating a clock channel associated with the clock line and used to communicate the clock CLK, as well as certain data channels associated with data signal lines used to respectively communicate write data during a write operation being executed by the eMMC system 100 of FIG. 1. In particular, each one of the foregoing channels is respectively configured to include a delay circuit according to certain embodiments of the inventive concept.

Referring to FIGS. 1, 2, 3, 4, 5 and 6 (collectively, "FIGS. 1 to 6"), the data transmission circuit 331 of FIGS. 4 and 5 may include delay circuits 430-1 to 430-8 respectively associated with data channels communicating write data via the plurality of data lines to the MMC 300 and with data input latches 431-1 to 431-8 and 432-1 to 432-8. The circuit diagram of FIG. 6 also shows a delay circuit 420 associated with the clock channel the receives the clock CLK from the host 200.

During write operations, the data transmission circuit 331 becomes enabled according to a control of the data I/O control unit 337 or the eMMC state control unit 339. A clock delay circuit 420 may adjust a delay of a clock CLK, output from the differential amplifier 71, in response to a clock selection signal SELC. The clock selection signal SELC may be transmitted from the CPU 340 and stored in a special function register(SFR) 460.

Data delay circuits 430-1 to 430-8 may respectively define an adjustment delay applied to one of data signals DAT[0] to DAT[7] provided from differential amplifiers 72 in response to data selection signals SEL0 to SEL7. For example, a first data delay circuit 430-1 may adjust a delay of a data signal DAT[0] output from one of the differential amplifiers 72 in response to a first data selection signal SEL0.

Defining an adjustment delay for the data signals DAT[0] to DAT[7] will reduce timing skew(s) between the data signals DAT[7:0]_eMMC illustrated in FIG. 2, and accordingly a maximum data valid window may be secured. For example, when an eighth data bus 103-8 has a second line capacitance value $C_{L2}$, and remaining data buses 103-1 to 103-7 except for the eighth data bus 103-8 have a first line capacitance value $C_{L1}$ as illustrated in FIG. 1, skew between data signals DAT[7:0]_eMMC illustrated in FIG. 2 may be reduced by adjusting a delay of an eighth data signal DAT[7] transmitted to the eMMC 300 through the eighth data bus 103-8.

Data selection signals SEL0 to SEL7 may be stored as "delay offset values" in a VENDOR_SPECIFIC_FIELD field of the EXT_CSD register 371. The delay offset values are set by a SWITCH command CMD6 of the host 200. Under the control of CPU 340, the data selection signals SEL0 to SEL7, stored as delay offset values in the VENDOR_SPECIFIC_FIELD field of the EXT_CSD register 371, may be stored in SFRs 431-1 to 431-8 and 432-1 to 432-8 through the buffer memory 350.

Each of the data signals DAT[0] to DAT[7] output from the data delay circuits 430-1 to 430-8 may include odd numbered data and even numbered data.

During write operations, the first data input latches 431-1 to 431-8 transmit odd numbered data among the data signals DAT[0] to DAT[7], output from the data delay circuits 430-1 to 430-8, to the buffer memory 350 in response to a rising edge of a "delayed clock" output from the clock delay circuit 420. Also during write operations, the second data input latches 432-1 to 432-8 transmit even numbered data among the data signals DAT[0] to DAT[7], output from the data delay circuits 430-1 to 430-8, to the memory 350 in response to a falling edge of the delayed clock output from the clock delay circuit 420.

Figure 7:
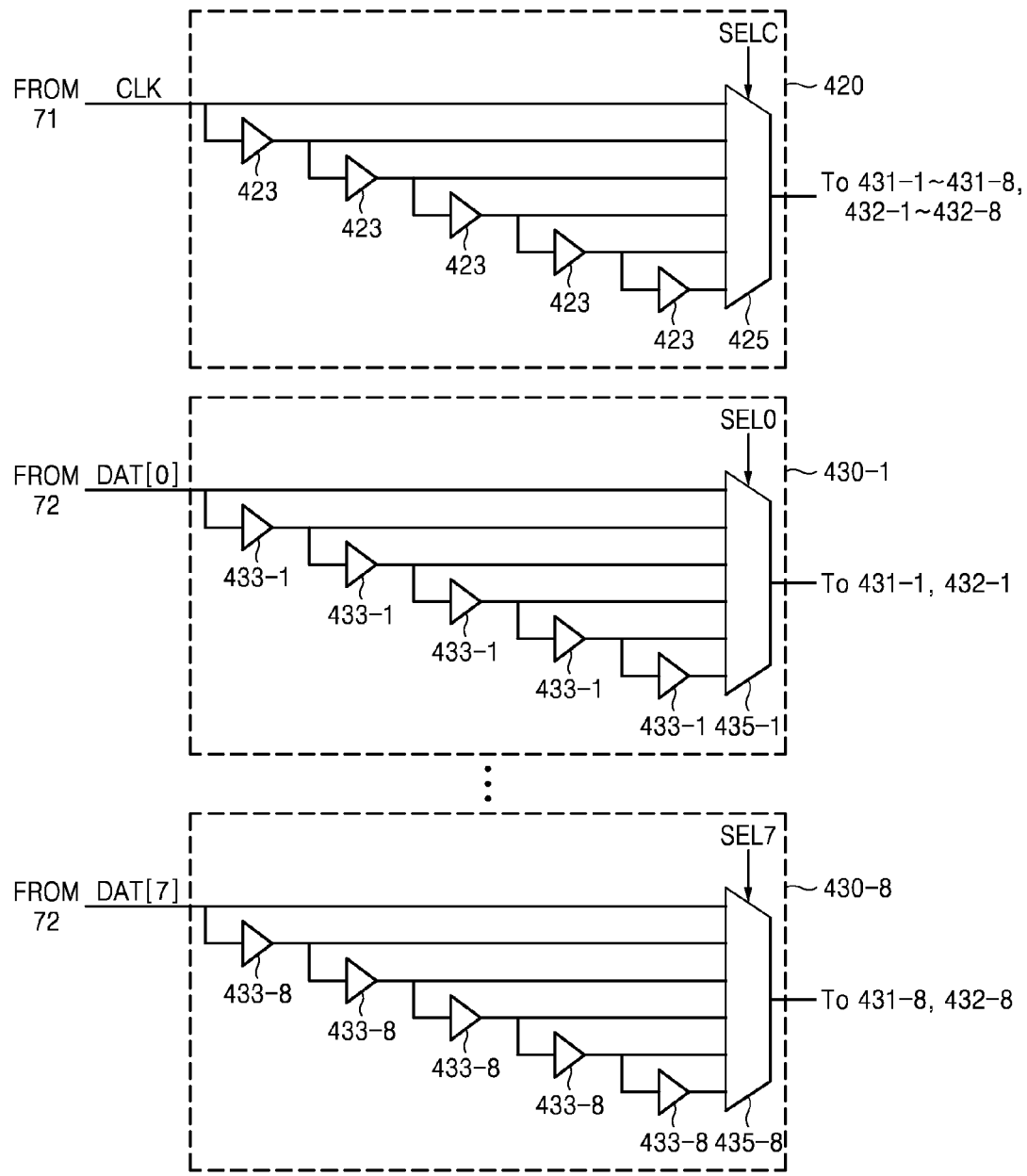
FIG. 7 is a block diagram further illustrating in one example the delay circuits of FIG. 6.

FIG. 7 is a block diagram further illustrating in one example the delay circuits of FIG. 6. Referring to FIGS. 6 and 7, the clock delay circuit 420 is used to define an adjustment delay for the clock CLK using buffers 423 and a selector 425. Thus, differently delayed versions of the clock CLK may be generated and selected among to provide the delayed clock. The selector 425 may be used to select one of the delayed versions of the clock CLK in accordance with a clock selection signal SELC, and provides the data input latches 431-1 to 431-8 and 432-1 to 432-8 with the delay clock.

Each of the data delay circuits 430-1 to 430-8 may similarly define an adjustment delay for a respective the data signal DAT[0] to DAT[7] using buffers 433-1 to 433-8 and selectors 435-1 to 435-8. For example, delayed data signals having different delay values by buffers 423-1 are generated from a first data signal DAT[0]. The selector 435-1 selects one of the delay data signals in response to a data selection signal SEL0 , and provides data input latches 431-1 and 432-1 with the delay data signal selected.

Figure 8:
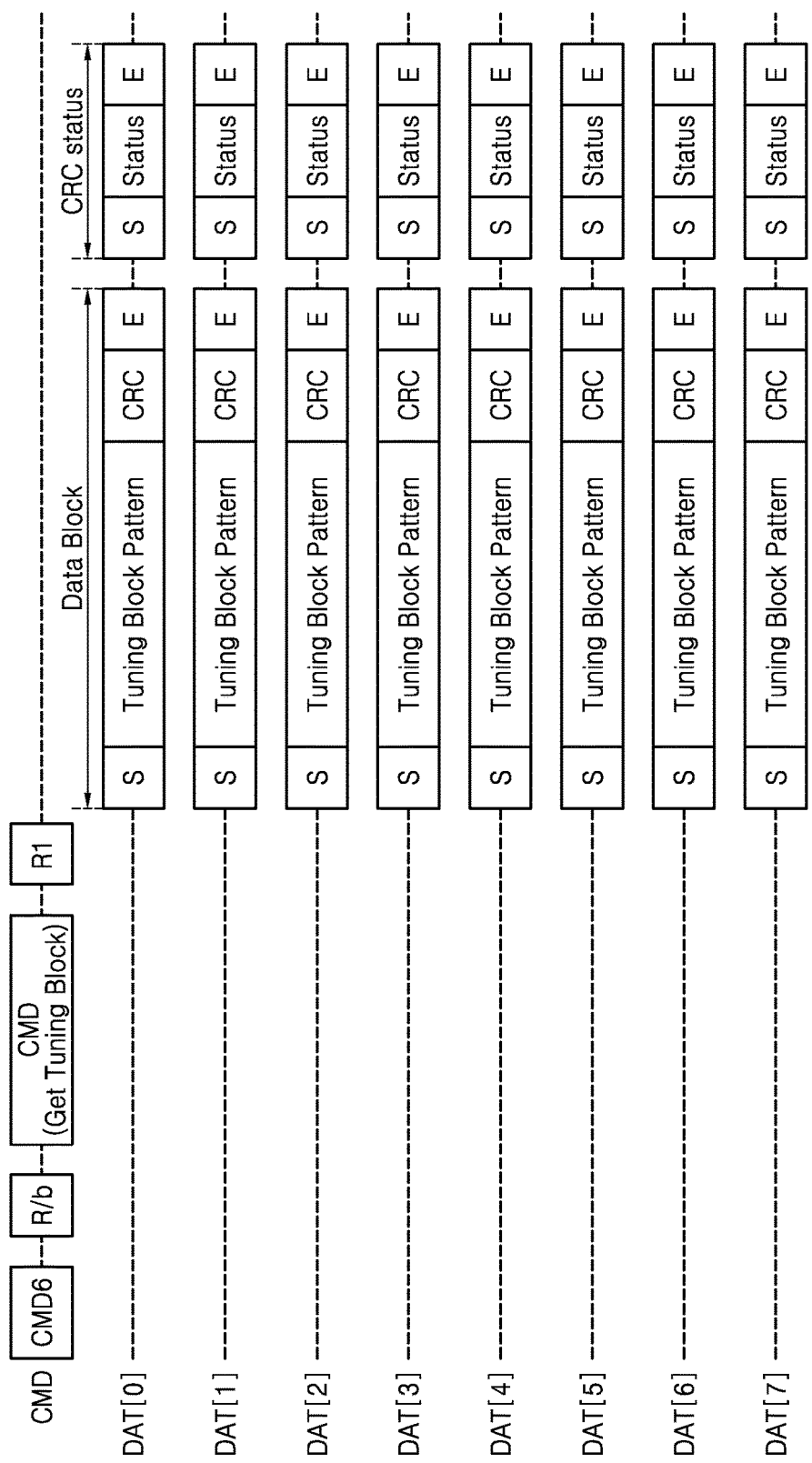
FIG. 8 is a timing diagram illustrating certain operational aspects for the host and eMMC in the eMMC system of FIG. 1.

FIG. 8 is a timing diagram further illustrating execution of a read operation performed by the host 200 of FIG. 1. Referring to FIGS. 1 and 8, the host 200 transmits a SWITCH command CMD6 to the eMMC 300 so as to set delay offset values of the data signals DAT[0] to DAT[7]. The eMMC 300 stores the delay offset values in the VENDOR_SPECIFIC_FIELD field of the EXT_CSD register in response to the SWITCH command CMD6, and transmits a response R1 b to the host 200.

The host 200 transmits a "Get Tuning Block" command to the eMMC 300. The eMMC 300 transmits a response R1 to the host 200 in response to the Get Tuning Block command. The host 200 transmits data to the eMMC 300 in response to the response R1 . The data includes a start bit, a tuning block pattern, cyclic redundancy codes (CRC), and an end bit. The tuning block pattern may be similar to a tuning block pattern according to a Send Tuning Block command CMD21 as defined in JESD84-B451 reference above.

The eMMC 300 compares the received tuning block pattern with a predetermined (or default) tuning block pattern. The default tuning block pattern may be stored in the flash memory 370 of the eMMC 300, and the eMMC 300 may communicate a CRC status token to the host 200 according to this comparison.

When the default tuning block pattern is the same as the received tuning block pattern communicated from the host 200, the eMMC 300 may transmit a positive CRC status token (e.g., '010') to the host 200. However, when the default tuning block pattern is different from the received tuning block pattern, the eMMC 300 may transmit a negative CRC status token (e.g., '101') to the host 200. In this manner, the host 200 may receive from the eMMC 300 a CRC status token indicating whether each of the data signals DAT[0] to DAT[7] is valid.

FIG. 9 is a table listing possible entries for the various fields for the EXT_CSD register 371 of FIG. 3. Referring to FIGS. 1, 2, 3, and 9, the eMMC 300 may be used to set delay offset values in the VENDOR_SPECIFIC_FIELD field of the EXT_CSD register 371 in response to the SWITCH command CMD6. An argument of the SWITCH command CMD6 is described by way of example in Table 1.

TABLE 1

| [2:0]   | [7:3]      | [15:8] | [23:16] | [25:24] | [31:16]    |
|---------|------------|--------|---------|---------|------------|
| CMD Set | Set to '0' | Value  | Index   | Access  | Set to '0' |

In Table 1, index bits [23:16] are related to an address of the VENDOR_SPECIFIC_FIELD field of the EXT_CSD register 371, and value bits[15:8] are related to delay offset values of the data signals DAT[0] to DAT[7]. For example, some slices[127:123] of the VENDOR_SPECIFIC FIELD field of the EXT_CSD register 371 may be assigned to a IO_TIMING field.

The IO_TIMING field includes an output delay offset of a return clock RCLK, an input delay offset of a clock CLK, and I/O delay offset values of a data valid window.

The eMMC 300 stores delay offset values of the data signals DAT[0] to DAT[7] in CSD slices[126:123] of the EXT_CSD register 371 in response to the SWITCH command CMD6. For example, the eMMC 300 stores a delay offset value of a first data signal DAT[0] in bits[0:3] of a CSD slice 123, and sets a delay offset value of a second data signal DAT[1] in bits[4:7] of the CSD slice 123. Here, a bit [3] and a bit [7] each represent a positive value or a negative value, and bits [0:2] and bits [4:6] represent a magnitude of a delay offset value, respectively.

FIG. 10 is a diagram illustrating relationships between valid/invalid data signals and assumed delay offset values. Referring to FIGS. 1, 2, and 10, a range of adjustment delay values '0 through 15' are used to indicate delay periods associated with individual delay offset values. The 'P' symbol indicates a valid data signal, the 'F' symbol indicates an invalid data signal, and the 'PB' symbol indicates an identified "best delay offset value." For example, assuming an initial delay offset value of '0', data signals DAT[0] to DAT[3], DAT[6] and DAT[7] are invalid, while only data signals DAT[4] and DAT[5] are valid.

The host 200, by repeatedly transmitting the SWITCH command CMD6 and the Get Tuning Block command to the eMMC 300, may determine whether the respective data signals DAT[0] to DAT[7] are valid or invalid in relation to a particular delay offset value.

Additionally in certain embodiments of the inventive concept, the host 200 may determine a number of "valid data signal instances" for each data signal DAT[0] to DAT[7] over a range of delay offset values. For example, according to the data tabulated in FIG. 10, the number of valid data signal instances for the first data signal DAT[0] is four (4), while the number of valid data signal instances for the third data signal DAT[2] is five (5). Using the information indicating a number of valid data signal instances over the range of delay offset values, the host 200 may determine a "best delay offset value" for each one of the data channels respectively associated with the data signals DAT[0] to DAT[7]. For example, the host 200 may determine that either the '2' or '3' delay offset value is the best delay offset value for the first data signal DAT[0], and that the '3' delay offset value is the best delay offset value for the third data signal DAT[2]. The host 200 may transmit a SWITCH command CMD6 to the eMMC 300 so as to set each best delay offset value selected for each of the respective data signals DAT[0] to DAT[7].

In certain embodiments of the inventive concept, the eMMC 300 may store each best delay offset value determined by the host 200 in the VENDOR_SPECIFIC_FIELD field of the EXT_CSD register 371 of FIG. 3. Accordingly, specific and intelligently selected adjustment delays for each one of the plurality of data signals DAT[0] to DAT[7] may be determined by the host 200 and thereafter used to secure an improved (or maximized) data valid window for each data signal DAT[0] to DAT[7] during subsequent write operations.

FIG. 11 is a table listing possible entries for a device type field according to an embodiments of the inventive concept. Referring to FIG. 11, a DEVICE_TYPE field 196 of the EXT_CSD register defines a type of the eMMC 300. In JESD84-B451, each Bit 0 to Bit 5 of the DEVICE_TYPE field 196 is only defined; however, information on whether the eMMC 300 supports a DDR 400 mode is stored in the DEVICE_TYPE field 196 according to an example embodiment of the present inventive concepts. For example, information on whether a 200 MHz DDR mode is supported at 1.8V (VCCQ=1.8V) is stored in a Bit 6, and information on whether the 200 MHz DDR mode is supported at 1.2V (VCCQ=1.2V) is stored in Bit 7.

The DEVICE_TYPE field 196 of the EXT_CSD register is transmitted from the eMMC 300 to the host 200 according to a SEND_EXT_CSD command CMD8 transmitted from the host 200. Accordingly, the host 200 may determine whether the eMMC 300 supports the DDR 400 mode based on Bit 6 or Bit 7 stored in the DEVICE_TYPE field 196 of the EXT_CSD register.

FIG. 12, inclusive of FIGS. 12A and 12B, illustrates HS_TIMING and HS_TIMING values according to certain embodiment of the inventive concept. The HS_TIMING field 185 of the EXT_CSD register may be used by the host 200 to select a timing interface and driver strength. According to certain embodiments, '0x3' is added to the HS_TIMING field 185.

When the host 200 sets the HS_TIMING field 185 to '1', the eMMC 300 changes a timing of the eMMC 300 into a high speed interface timing. When the host 200 sets the HS_TIMING field 185 to '2', the eMMC 300 changes a timing of the eMMC 300 into a HS 200 interface timing.

When the host 200 sets the HS_TIMING field 185 to '3', the eMMC 300 changes a timing of the eMMC 300 into a DDR 400 interface timing. Embodiments of the inventive concept operating according to DDR 400 interface timing are shown in FIGS. 13, 14, 15 and 16. That is, the host 200 may be set a DDR 400 bit and a driver strength value in the HS_TIMING field 185 of the EXT_CSD register by issuing a SWITCH command CMD6.

Figure 13:
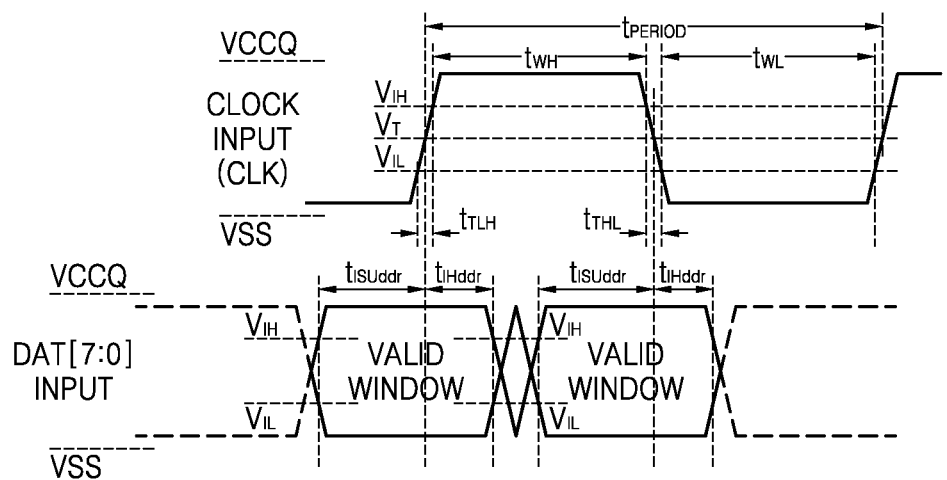
FIG. 13 is timing diagram illustrating DDR 400 input timing considerations relevant to certain embodiment of the inventive concept.

FIG. 13 is a timing diagram illustrating DDR 400 device input timing according to certain embodiments of the inventive concepts, and FIG. 14 is a table listing parameters related to the DDR 400 device input timing diagram of FIG. 13. Similarly, FIG. 15 is timing diagram illustrating DDR 400 device output timing according to certain embodiment of the inventive concept, and FIG. 16 is a table listing parameters related to the DDR 400 device output timing diagram of FIG. 15.

Figure 15:
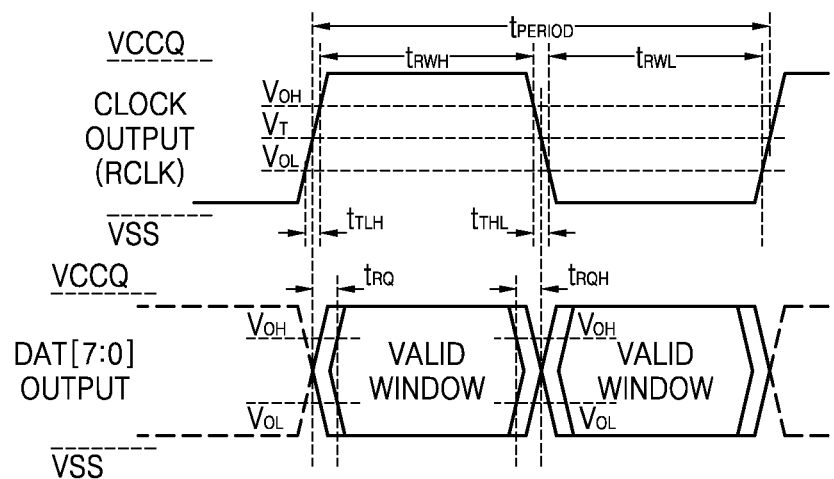
FIG. 15 is a timing diagram illustrating DDR 400 output timing considerations relevant to certain embodiments of the inventive concept.

Referring to FIGS. 15 and 16 in the context of the embodiments previously described, tRQ and tRQH define skew between output data signals DAT[7:0] OUTPUT and a return clock RCLK as AC timing parameter of parallel data signals DAT[7:0] output from the host 200. Here, tRQ denotes an output hold skew, and tRQH denotes an output hold time. tRQ is a limitation of retaining data until an edge of a return clock RCLK occurs, and tRQH is a limitation of changing data into normal data by a certain time after an edge of the return clock RCLK has occurred.

Figure 17:
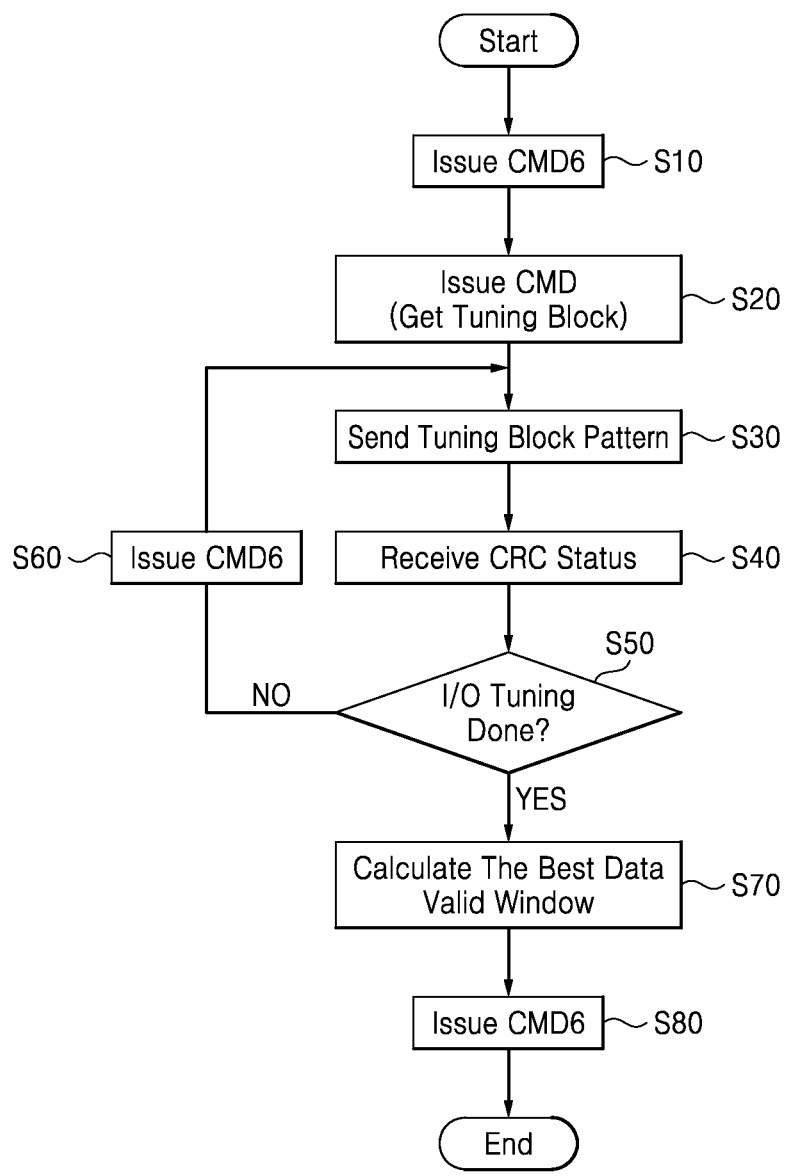
FIG. 17 is a flowchart summarizing one possible method of operating the eMMC system of FIG. 1.

FIG. 17 is a flowchart summarizing one possible method of operating the eMMC system 100 of FIG. 1. Referring to FIGS. 1 and 17 together with the previously described embodiments, the host 200 issues a SWITCH command CMD6 including at least one delay offset value that the eMMC 300 may use to selectively define an adjustment delay for one or ore of the data signals DAT[0] to DAT[7] (S10).

Next, the host 200 issues a Get Tuning Block command to the eMMC 300 to determine the valid/invalid state of the data signals DAT[0] to DAT[7] (S20), and the eMMC 300 returns a response R1. Then, the host 200 may communicate data describing a tuning block pattern to the eMMC 300 in response to the response R1 (S30).

The host 200 receives a CRC status token, indicating whether the tuning block pattern for data signals DAT[0] to DAT[7] are valid/invalid according to the communicated data blocks from the eMMC 300 (S40). The host 200 then determines whether an I/O tuning process is complete (S50). That is, the host 200 repeatedly transmits a SWITCH command CMD6, including different delay offset values, and the Get Tuning Block command to the eMMC 300 until receiving the each CRC status token, indicating the data signals DAT[0] to DAT[7] are all invalid.

So long as the I/O tuning is not complete, that is, the host 200 receives a CRC status token indicating at least one of the data signals DAT[0] to DAT[7] is valid, the host 200 transmits a SWITCH command CMD6 to the eMMC 300 so as to change the delay offset value and set the delay offset value changed (S60).

When the I/O tuning process is complete, that is, the host 200 receives the each CRC status token indicating all of the data signals DAT[0] to DAT[7] are invalid, the host 200 determines a best delay offset value corresponding to a maximized data valid window (S70). Then, the host 200 transmits a SWITCH command CMD6 to the eMMC 300 to set the best delay offset values for the eMMC 300 (S80).

Figure 18:
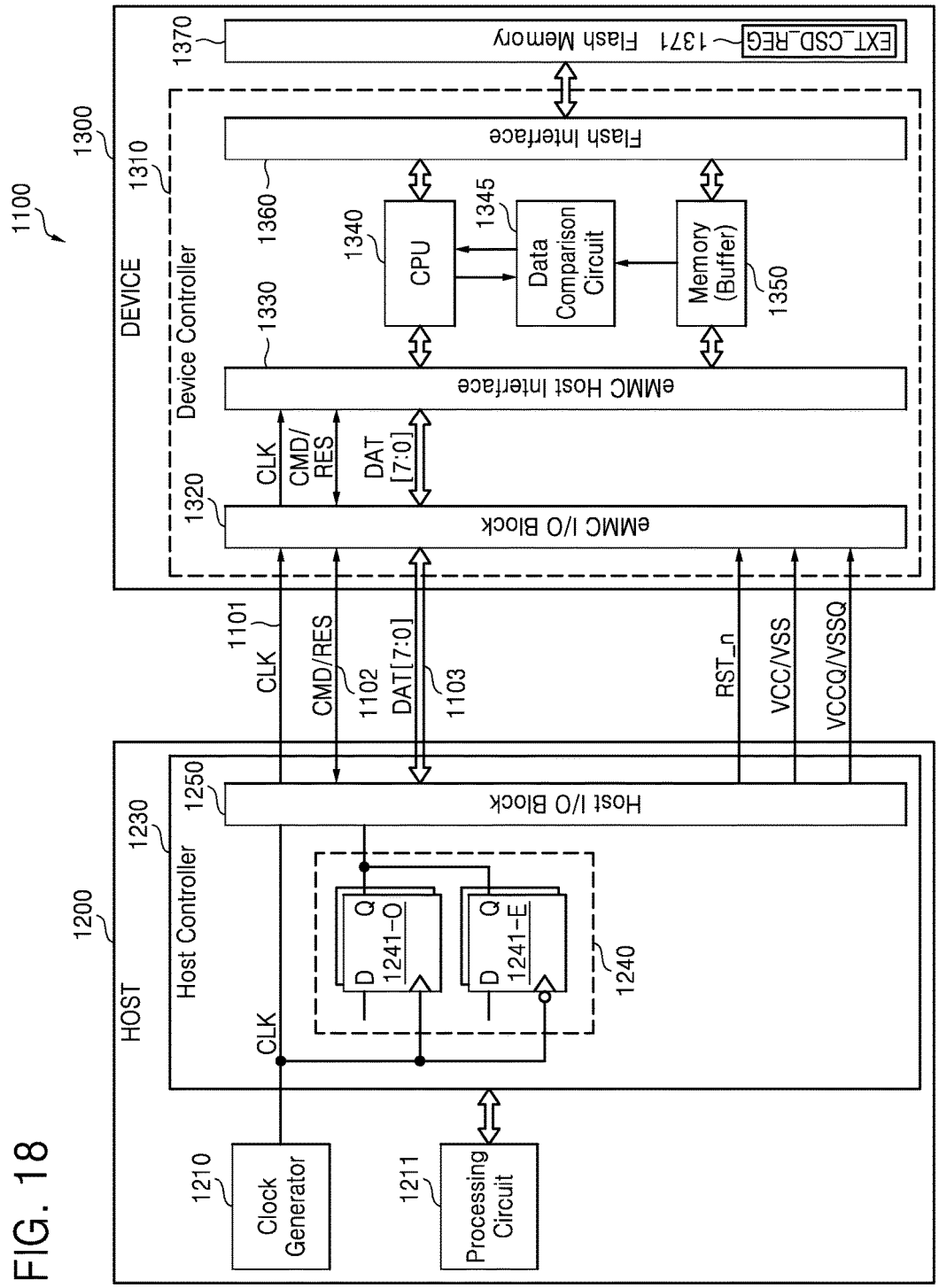
FIG. 18 is a block diagram of an eMMC system capable of performing an input/output (I/O) tuning process during a data write operation according to certain embodiments of the inventive concept.

FIG. 18 is a block diagram of an eMMC system 1100 including an embedded multimedia card (eMMC) 1300 capable of performing an I/O tuning process during a write operation according to embodiments of the inventive concept. Referring to FIG. 18, the eMMC system 1100 generally comprises a host 1200 and the device (eMMC) 1300.

The host 1200 may control a data processing operation of the eMMC 1300, e.g., a data read operation or a data write operation. The data processing operation may be performed at a single data rate (SDR) or a DDR.

The host 1200 may mean a data processing device itself which may process data such as a central processing unit (CPU), a processor, a microprocessor or an application processor (AP).

In addition, the data processing device may be embedded or embodied in an electronic device.

The eMMC 1300 may be electrically connected to the electronic device through connection means, e.g., pads, pins, a bus, or communication lines, for communications with the host 1200.

The host 1200 may include a clock generator 1210, a processing circuit 1211, and a host controller 1230.

The clock generator 1210 generates a clock CLK to be used in the host 1200 and the eMMC 1300. For example, the clock generator 1210 may be embodied in a phase locked loop (PLL).

The processing circuit 1211 may mean hardware having embedded hardware or software (or firmware) which may control generation of a command CMD, interpretation of a response (RES), processing of data stored in an Extended (EXT)_CSD register 371, and/or an operation of processing I/O data. The processing circuit 1211 may control an operation of each component 1210 and 1230.

The processing circuit 1211 may transmit an I/O (IO) tuning command CMD newly defined in the present inventive concepts to the eMMC 1300, and transmit tuning block data signals, e.g., a tuning block pattern, to the eMMC 1300 based on a response RES transmitted from the eMMC 1300, i.e., a response to an I/O tuning command.

The eMMC 1300 may perform an I/O tuning process which searches for an optimal sampling point of data signals based on an I/O tuning command CMD and tuning block data signals transmitted from the host 1200.

That is, the I/O tuning process is performed not by the host 1200 but by the eMMC 1300. The I/O tuning process may be performed after the eMMC 1300 is switched to a HS200 mode or the DDR400 mode. After the I/O tuning process is completed, a data write operation may be performed.

A host controller 1230 includes a data output circuit 1240 and a host I/O block 1250.

During the data write operation, the data output circuit 1240 transmits, in response to a clock CLK, data signals DAT[7:0] to be written in a flash memory 1370 of the eMMC 1300 to the host I/O block 1250.

The data output circuit 1240 includes first write latches 1241-O and second write latches 1241-E.

In response to a rising edge of a clock CLK, the first write latches 1241-O latch odd numbered data signals among data signals to be written in the eMMC 1300.

In response to a falling edge of the clock CLK, the second write latches 1241-E latch even numbered data signals among the data signals.

The host 1200 transmits a clock CLK to the eMMC 1300 through a clock bus 1101.

Through a command bus 1102, the host 1200 transmits a command CMD to the eMMC 1300, and receives a response RES transmitted from the eMMC 1300.

Through a data bus 1103, the host 1200 transmits data signals DAT[7:0] to the eMMC 1300, and receives read data signals DAT[7:0] transmitted from the eMMC 1300. As illustrated in FIGS. 21 through 23, the data signals DAT[7:0] are synchronized with a clock CLK and transmitted to the eMMC 1300.

The host 1200 transmits a hardware reset signal RST_n to the eMMC 1300 through a reset line.

The host 1200 generates I/O operation voltages VCCQ and VSSQ to be used in each I/O block 1250 and 1320, and transmits the I/O operation voltages VCCQ and VSSQ to the eMMC 1300 through power lines.

The host 1200 generates core operation voltages VCC and VSS to be supplied to the flash memory 1370, and transmits the core operation voltages VCC and VSS to the eMMC 1300 through core power lines. Here, VSSQ and VSS are ground voltages.

The eMMC 1300 includes a device controller, e.g., an eMMC controller 1310, and the flash memory 1370.

The eMMC controller 1310 controls data communication between the host 1200 and the flash memory 1370.

The eMMC controller 1310 includes an eMMC I/O block 1320, an eMMC host interface 1330, a CPU 1340, a data comparison circuit 1345, a memory 1350, and a flash interface 1360.

The eMMC host interface 1330 receives a command CMD through the eMMC I/O block 1320, interprets the received command CMD, generates a response RES according to a result of the interpretation, and transmits the generated response RES to the eMMC I/O block 1320.

During the I/O tuning process, the eMMC host interface 1330 may store tuning block data signals received through the eMMC I/O block 1320 in the memory 1350.

During write operations, the eMMC host interface 1330, according to a control of the CPU 1340, stores data signals DAT[7:0] received through the eMMC I/O block 1320 in the memory 1350, e.g., a buffer, using a clock CLK. Here, the flash interface 1360, according to a control of the CPU 1340, reads data signals stored in the memory 1350, and writes the read data signal in the flash memory 1370.

During read operations, the flash interface 1360, according to a control of the CPU 1340, stores data signals output from the flash memory 1370 in the memory 1350. Here, according to a control of the CPU 1340, the eMMC host interface 1330 reads data signals stored in the memory 1350 and transmits the read data signals DAT[7:0] to the eMMC I/O block 1320.

The CPU 1340 controls an operation of each interface 1330 and 1360, and generally controls an operation of the eMMC 1300.

During the I/O tuning process, the data comparison circuit 1345 compares between reference data signals and delay-adjusted tuning block data signals output from the memory 1350, and transmits comparison signals corresponding to a result of the comparison to the CPU 1340. Here, the CPU 1340 interprets the comparison signals, and generates a clock adjusting code and data adjusting codes based on a result of the interpretation. According to a control of the CPU 1340, the data comparison circuit 1345 becomes enabled only during the I/O tuning process.

During a data read operation or a data write operation, the memory 1350 temporarily stores data signals transmitted or received between interfaces 1330 and 1360.

However, during the I/O tuning process, the memory 1350 stores reference data signals received through the flash interface 1360 and delay-adjusted tuning block data signals received through the eMMC host interface 1330, and transmits these signals to the data comparison circuit 1345. The memory 1350 may be embodied in a volatile memory such as a buffer.

The flash memory 1370 stores data signals, e.g., reference data signals. When the flash memory 1370 is embodied in a NAND flash memory, the flash interface 1360 may be embodied in a NAND flash memory interface. The flash memory 1370 includes an EXT_CSD register 1371 which may store device properties and selected modes. The host 1200 may read data stored in the EXT_CSD register 1371 by issuing a SEND_EXT_CSD command CMD8.

Figure 19:
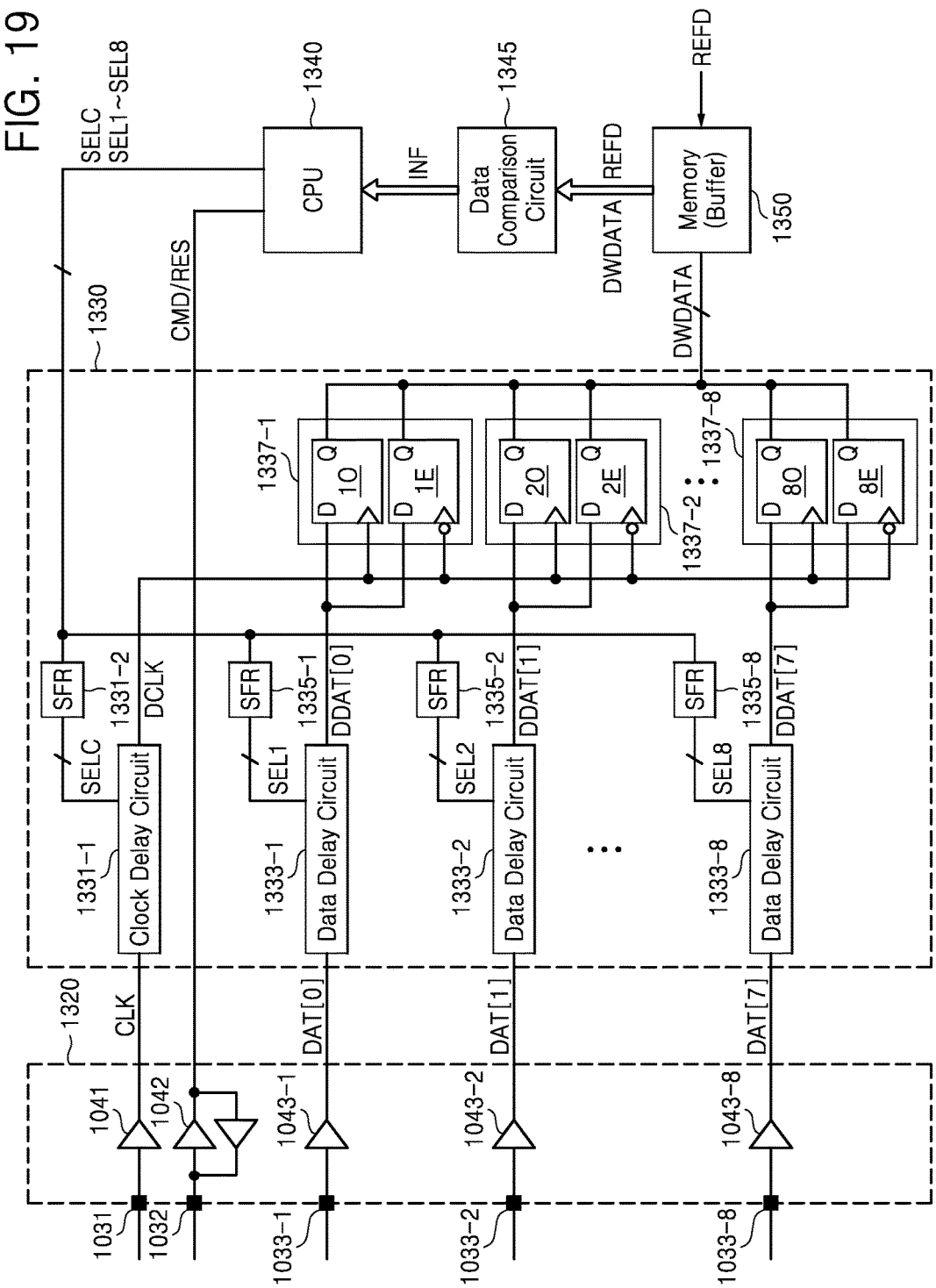
FIG. 19 is a circuit diagram illustrating portions of the eMMC system of FIG. 18 including clock, command and data channels.
Figure 20:
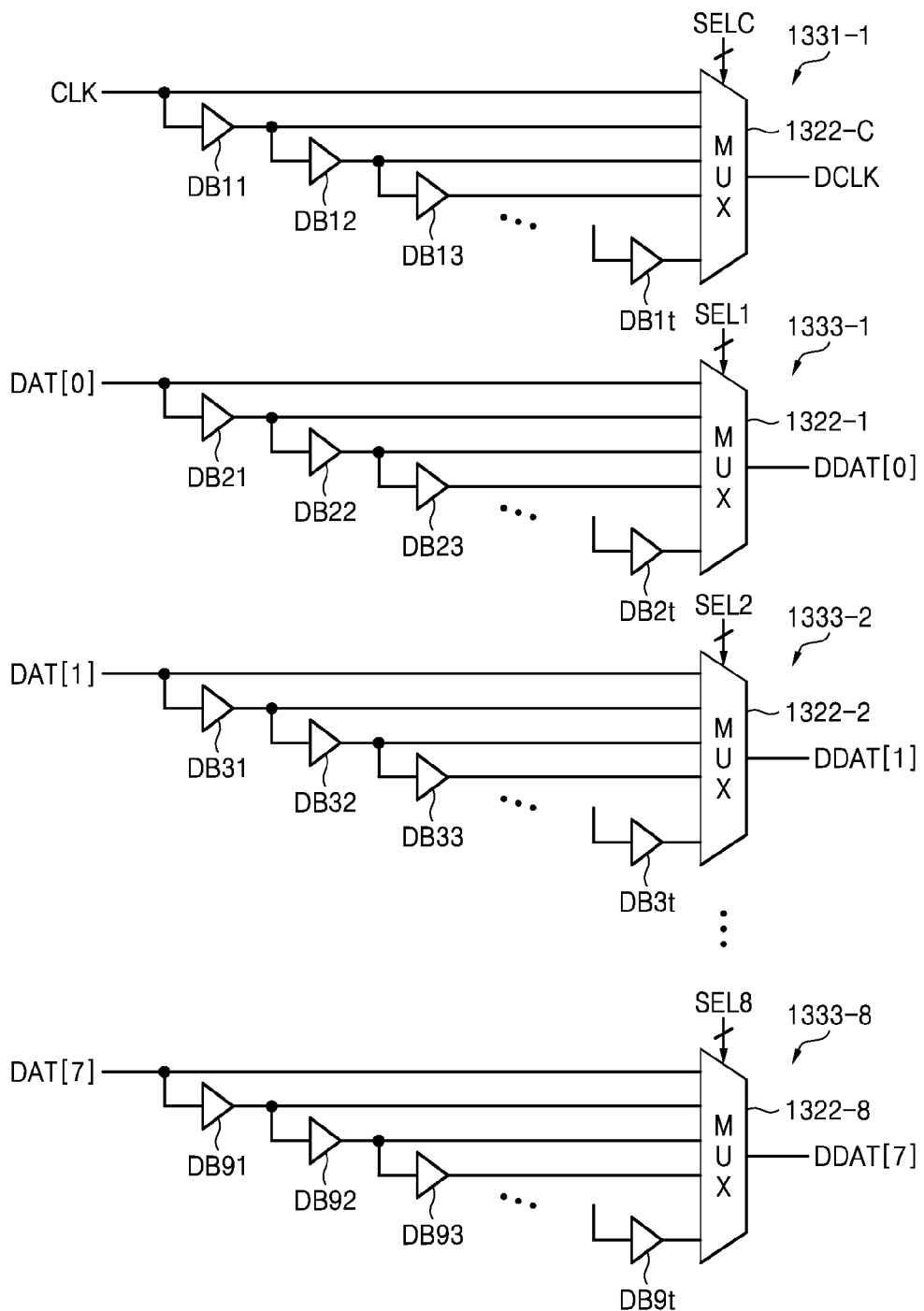
FIG. 20 is a circuit diagram further illustrating in one example the delay circuits of FIG. 19.

FIG. 19 is a circuit diagram further illustrating the eMMC system 1100 of FIG. 18, and FIG. 20 is a circuit diagram further illustrating the delay circuits of FIG. 19.

Referring to FIGS. 19 and 20, the eMMC 110 block 1320 includes eMMC pads 1031 to 1033-8 and receivers 1041 to 1043-8.

The eMMC host interface 1330 includes a clock delay circuit 1331-1, data delay circuits 1333-1 to 1333-8, programmable memories 1331-2 and 1335-1 to 1335-8, and latch circuits 1337-1 to 1337-8.

The clock delay circuit 1331-1 adjusts a delay of a clock CLK input through a clock channel based on a clock adjusting code SELC, and outputs the delay-adjusted clock DCLK. The clock delay circuit 1331-1 may be called a delay adjustable clock path.

Each of the data delay circuits 1333-1 to 1333-8 adjusts each delay of data signals DAT[0] to DAT[7], input through each of data channels, based on each of data adjusting codes SEL1 to SEL8 , and outputs each of the delay-adjusted data signals DDAT[0] to DDAT[7]. Each of the data delay circuits 1333-1 to 1333-8 may be called a delay adjustable data path.

Each adjusting code SELC and SEL1 to SEL8 includes one-bit or more.

Each programmable memory 1331-2 and 1335-1 to 1335-8 may store each adjusting code SELC and SEL1 to SEL8 output from the CPU 1340. For example, each programmable memory 1331-2 and 1335-1 to 1335-8 may be embodied in a specific function register (SFR).

When the eMMC system 1100 is initialized, when the eMMC 1300 is initialized, when the eMMC 1300 exits from a standby mode, after the eMMC 1300 is switched to a HS200 mode, or after the eMMC 1300 is switched to a DDR400, each programmable memory 1331-2 and 1335-1 to 1335-8 becomes initialized.

That is, the eMMC 1300 needs to initialize each adjusting code SELC and SEL1 to SEL8 stored in each programmable memory 1331-2 and 1335-1 to 1335-8 whenever an operation mode is switched.

Each of the latch circuits 1337-1 to 1337-8 latches each output signal DDAT[0] to DDAT[7] of the data delay circuits 1333-1 to 1333-8 in response to a clock DCLK which is delay-adjusted by the clock delay circuit 1331-1.

Each lath circuit 1337-1 to 1337-8 includes each first latch 1O to 8O and each second latch 1E to 8E.

Each first latch 1O to 8O latches each output signal DDAT[0] to DDAT[7] of the data delay circuits 1333-1 to 1333-8 in response to a rising edge of an output signal DCLK of the clock delay circuit 1331-1.

Each second latch 1E to 8E latches each output signal DDAT[0] to DDAT[7] of the data delay circuits 1333-1 to 1333-8 in response to a falling edge of the output signal DCLK of the clock delay circuit 1331-1.

During an I/O tuning process, the CPU 1340 generates a clock adjusting code SELC and data adjusting codes SEL1 to SEL8 based on comparison signals INF output from the data comparison circuit 1345, and programs or updates each generated adjusting code SELC and SEL1 to SEL8 in each programmable memory 1331-2 and 1335-1 to 1335-8.

During the I/O tuning process, the data comparison circuit 1345 compares between the delay-adjusted tuning block data signals DWDATA and the reference data signals REFD output from the memory 1350, and generates comparison signals INF.

The CPU 1340 searches for an optimal sampling point of data signals based on the comparison signals INF, and programs or updates each adjusting code SELC and SEL1 to SEL8 in each programmable memory 1331-2 and 1335-1 to 1335-8 to secure a data valid window.

During the I/O tuning process, the memory 1350 stores the tuning block data signals DWDATA restored in response to the delay-adjusted clock DCLK and the reference data signal REFD.

A code generation circuit may compare the reference data signals REFD with output data signals DWDATA of the latch circuits 1337-1 to 1337-8, and generate a clock adjusting code SELC and data adjusting codes SEL1 to SEL8 based on a result of the comparison.

The code generation circuit includes the programmable memories 1331-2 and 1335-1 to 1335-8, the CPU 1340, the data comparison circuit 1345, and the memory 1350.

As illustrated in FIG. 20, the clock delay circuit 1331-1 includes clock delay elements DB11 to DB1t, where t is a natural number, e.g., delay buffers, and a clock selection circuit 1322-C.

Each of the clock delay elements DB11 to DB1t generates a delay clock having a different delay based on a clock CLK. The clock selection circuit 1322-C may output one of output signals of the clock delay elements DB11 to DB1t as a delay-adjusted clock DCLK based on the clock adjusting code SELC.

A first data delay circuit 1333-1 includes first delay elements DB21 to DB2t, e.g., delay buffers, and a first data selection circuit 1322-1.

Each of the first delay elements DB21 to DB2t generates a first delay data signal having a different delay based on a first data signal DAT[0]. The first data selection circuit 1322-1 may output one of output signals of the first delay elements DB21 to DB2t as a delay-adjusted first data signal DDAT[0] based on a first data adjusting code SEL1.

A second data delay circuit 1333-2 includes second delay elements DB31 to DB3t, e.g., delay buffers, and a second data selection circuit 1322-2.

Each of second delay elements DB31 to DB3t generates a second delay data signal having a different delay based on a second data signal DAT[1]. The second data selection circuit 1322-2 may output one of output signals of the second delay elements DB31 to DB3t as a delay-adjusted second data signal DDAT[1] based on a second data adjusting code SEL2.

Likewise, an eighth data delay circuit 1333-8 includes eighth delay elements DB91 to DB9t, e.g., delay buffers, and an eighth data selection circuit 1322-8.

Each of eighth delay elements DB91 to DB9t generates an eighth delay data signal having a different delay based on an eighth data signal DAT[7]. The eighth data selection circuit 1322-8 may output one of output signals of the eighth delay elements DB91 to DB9t as a delay-adjusted eighth data signal DDAT[7] based on an eighth data adjusting code SEL8.

Each selection circuit 1322-C and 1322-1 to 1322-8 may be embodied in a multiplexer.

For example, each selection circuit 1322-C and 1322-1 to 1322-8 outputs an output signal of a delay element, e.g., DB13. DB23, . . . , DB93 when t is 5, among corresponding delay elements based on each initialized adjusting code SELC and SEL1 to SEL8 as a default, each delay circuit 1331-1 and 1333-1 to 1333-8 may decrease or increase a delay of each delay circuit 1331-1 and 1333-1 to 1333-8 based on each adjusting code SELC and SEL1 to SEL8 set by the CPU 1340.

FIGS. 21A, 21B, 22A, 22B, 23A and 23B are timing diagrams respectively illustrating certain embodiments of the inventive concept performing an I/O tuning process using the eMMC system 1100 of FIG. 18.

First, CLK_HOST is a clock output from the host 1200, DAT_HOST[7:0] are data signals output from the host 1200, CLK_eMMC is a clock input to the eMMC 1300 through a clock bus 1101 or a clock output from the receiver 1041, DAT_eMMC[6:0] are data signals input to the eMMC 1300 through a first line to a seventh line of a data bus 1103 or data signals output from receivers 1043-1 to 1043-7, and DAT-eMMC[7] is data signal input to the eMMC 1300 through an eighth line among the data bus 1103 or a data signal output from a receiver 1043-8.

For convenience of explanation, it is assumed that RLC load of a clock bus 1101 (hereinafter: 'first load') is less than RLC load of the eighth line (hereinafter: 'second load'), each RCL load of the first line to the seventh line is the same as the first load, tDL1 is a delay caused by the first load, and the tDL2 is a delay caused by the second load.

Through the I/O tuning process according to an example embodiment of the present inventive concepts, a method for adjusting a delay of a clock CLK is explained by referring to FIGS. 21A and 21B.

As illustrated in FIG. 21A, when a delay of the DAT_eMMC[7] is increased by the second load, skew occurs between each data DAT[0] to DAT[7]. Accordingly, setup time of the DAT_eMMC[7] decreases as much as tDL2−tDL1, and the clock delay circuit 1331-1 increases a delay of a clock CLK based on the clock adjusting code SELC set by the CPU 1340 through the I/O tuning process, and outputs a delay-adjusted clock DCLK.

For example, the clock delay circuit 1331-1 sets a delay of a clock CLK to tDL2 based on the clock adjusting code SELC set by the CPU 1340, and outputs a delay-adjusted clock DCLK.

As illustrated in FIG. 21B, a rising edge of the delay-adjusted clock DCLK is located in a center of the DAT_eMMC[7]. Referring to FIGS. 21A and 21B, setup time of the DAT_eMMC[7] increases and hold time of the DAT_eMMC[7] decreases through the I/O tuning process.

For example, the setup time increased is set to (tDL2−tDL1)/2 and the hold time decreased is set to (tDL2−tDL1)/2, a data valid window may be secured.

Figure 22A:
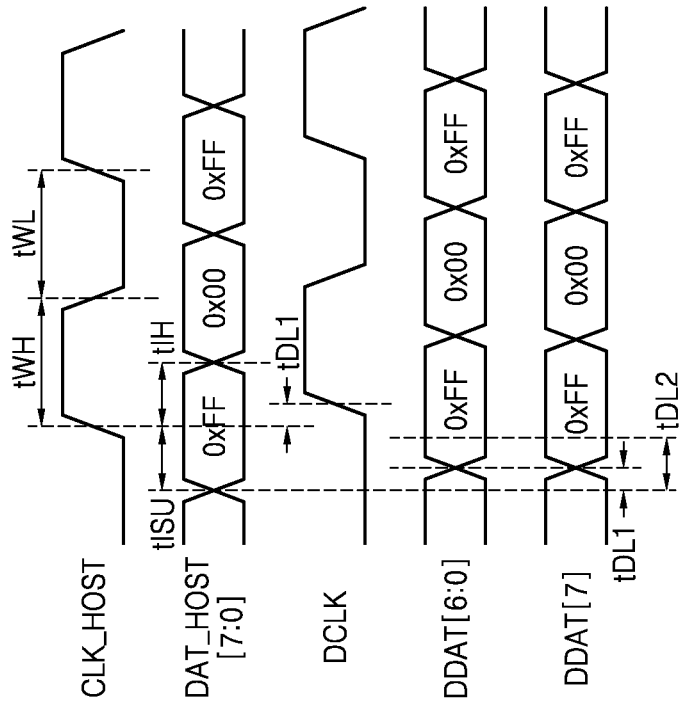
Figure 22B:
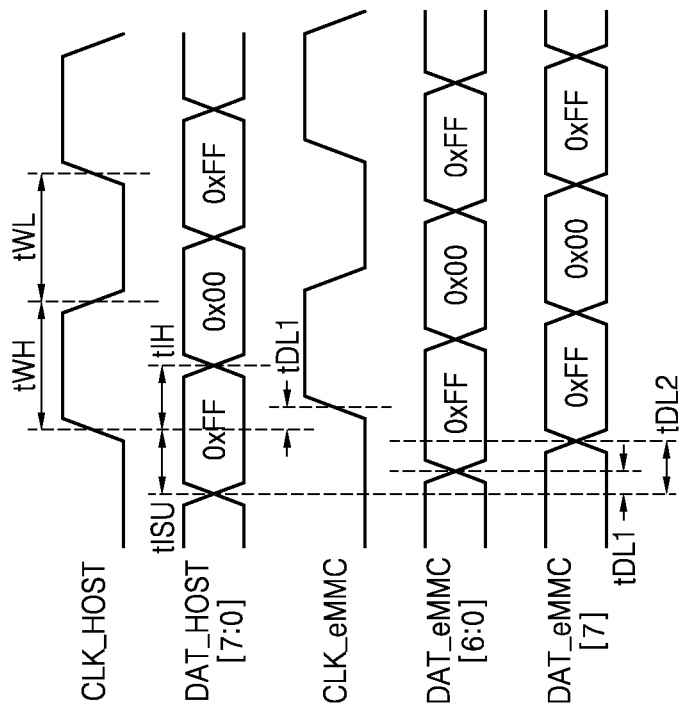

A method for decreasing a delay of the eighth data signal DAT_eMMC[7] through the I/O tuning process according to example embodiment of the present inventive concepts is explained by referring to FIGS. 22A and 22B.

An eighth data delay circuit 1333-8 decreases a delay of the eighth data DAT_eMMC[7] based on an eighth data adjusting code SEL8 set up by the CPU 1340 through the I/O tuning process, and outputs the delay-adjusted eighth data signal DDAT[7].

For example, an eighth data delay circuit 1333-8 sets a delay of the eighth data signal DAT_eMMC[7] to tDL1 based on the eight data adjusting code SEL8 set by the CPU 1340, and outputs the delay-adjusted eighth data signal DDAT[7].

As illustrated in FIG. 22B, when both a delay of data signals DDAT[7:0] and a delay of a clock DCLK are adjusted to tDL1, a valid window of delay-adjusted data signals DDAT[7:0] is secured in the same way as a valid window of data signals DAT_HOST[7:0].

Figure 23B:
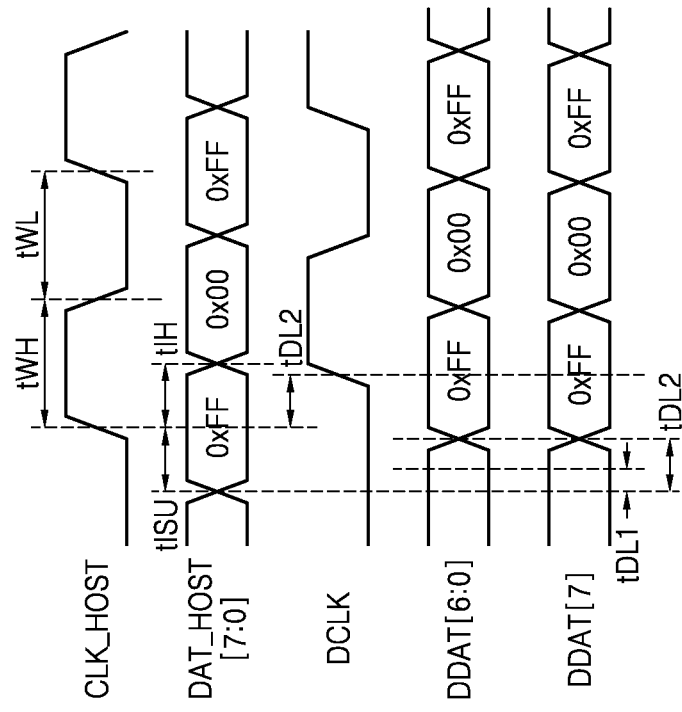
Figure 23A:
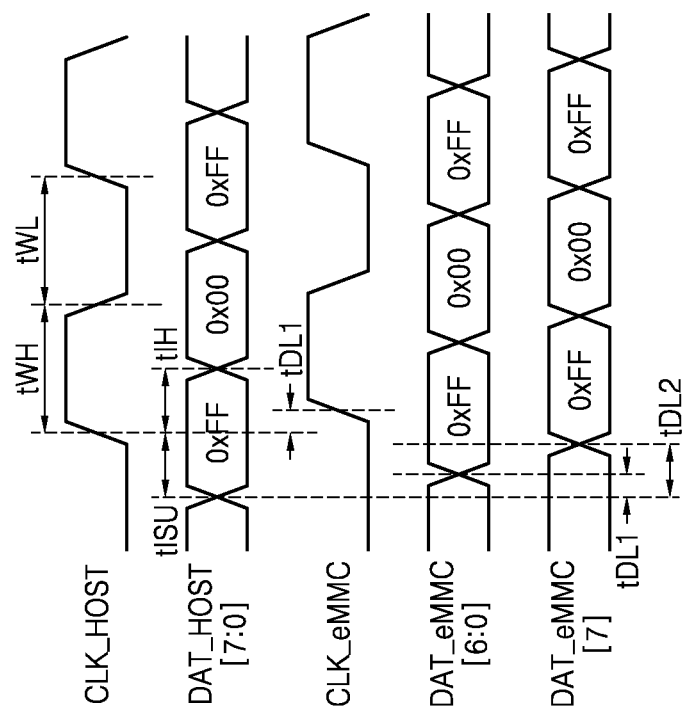

A method for adjusting a delay of a clock CLK and a delay of DAT_eMMC[6:0] through the I/O tuning process according to embodiments of the present inventive concepts is explained by referring to FIGS. 23A and 23B.

The clock delay circuit 1331-1 increases a delay of a clock CLK based on a clock adjusting code SELC set by the CPU 1340 through the I/O tuning process, and outputs a delay-adjusted clock DCLK.

For example, the clock delay circuit 1331-1 sets a delay of the clock CLK based on the clock adjusting code SELC set by the CPU 1340, and outputs the delay-adjusted clock DCLK.

Each of the data delay circuits besides the eighth data delay circuit 1333-8 increases each delay of the data signals DAT_eMMC[6:0] based on each of the data adjusting codes set by the CPU 1340 through the I/O tuning process, and outputs each of the delay-adjusted data signals DDAT[6:0].

As illustrated in FIG. 22B, when both each delay of the delay-adjusted data signals DDAT[7:0] and a delay of the clock DCLK are adjusted to tDL2, a valid window of the delay-adjusted data signals DDAT[7:0] is secured in the same way as a valid window of data signals DAT_HOST[7:0].

As described by referring to FIGS. 18 to 23B, during the I/O tuning process before a data write operation is performed, the eMMC 1300 may decrease skew between data signals DAT[7:0] or DAT_eMMC[7:0] and a clock CLK or CLK_eMMC by adjusting each delay of data signals DAT[7:0] or DAT_eMMC[7:0] and/or a delay of a clock CLK or CLK_eMMC.

Accordingly, the eMMC 1300 may increase a maximum data transmission speed, and increase overall data throughput.

FIG. 24 is a flowchart summarizing an I/O tuning process for the eMMC system 1100 of FIG. 18, and an exemplary I/O tuning sequence will be explained with reference to FIGS. 18, 19, 20, 21A, 21B, 22A, 22B, 23A, 23B and 24.

The host 1200 performs the I/O tuning process to secure a valid window of data or when each adjusting code SELC and SEL1 to SEL8 stored in each programmable memory 1331-2 and 1335-1 to 1335-8 is initialized by initialization of the eMMC 1300.

As described above, when the eMMC system 1100 is initialized, when the eMMC 1300 is initialized, when the eMMC 1300 exists from a standby mode, after the eMMC 1300 is switched to the HS200 mode, after the eMMC 1300 is switched to the DDR400 mode, or after an operation mode of the eMMC 1300 is switched, the I/O tuning process or an I/O tuning operation is started.

The host 1200 transmits an I/O tuning command to the eMMC 1300 (S110).

The eMMC 1300 transmits a normal response to the host 1200 when the eMMC 1300 may perform an I/O tuning process or an I/O tuning operation based on the I/O tuning command (S 120).

However, when the eMMC 1300 may not perform the I/O tuning process or the I/O tuning operation, the eMMC 1300 transmits a response that the eMMC 1300 may not support the I/O tuning process to the host 1200 (S121).

The host 1200 which has received a normal response transmits tuning block data signals or tuning block data to the eMMC 1300 through the data bus 1103 (S 130).

The eMMC 1300 reads reference data signals or reference data from the flash memory 1370, stores the read reference data in the memory 1350, and stores a delay-adjusted tuning block data in the memory 1350.

In addition, the eMMC 1300 compares the delay-adjusted tuning block data output from the memory 1350 with the reference data, and generates comparison signals INF (S 140).

The eMMC 1300 searches for a data valid window based on the comparison signals INF (S 150).

When the data valid window is searched out, i.e., when the I/O tuning process is completed, the eMMC 1300 transmits a cyclic redundancy check (CRC) Pass response to the host 1200 (S161).

However, when the data valid window is not searched out, i.e., when the I/O tuning process is not completed, the eMMC 1300 transmits a CRC Fail response to the host 1200 (S 162). Accordingly, the host 1200 transmits tuning block data to the eMMC 1300 through the data bus 1103 based on the CRC fail response (S 130).

Figure 25:
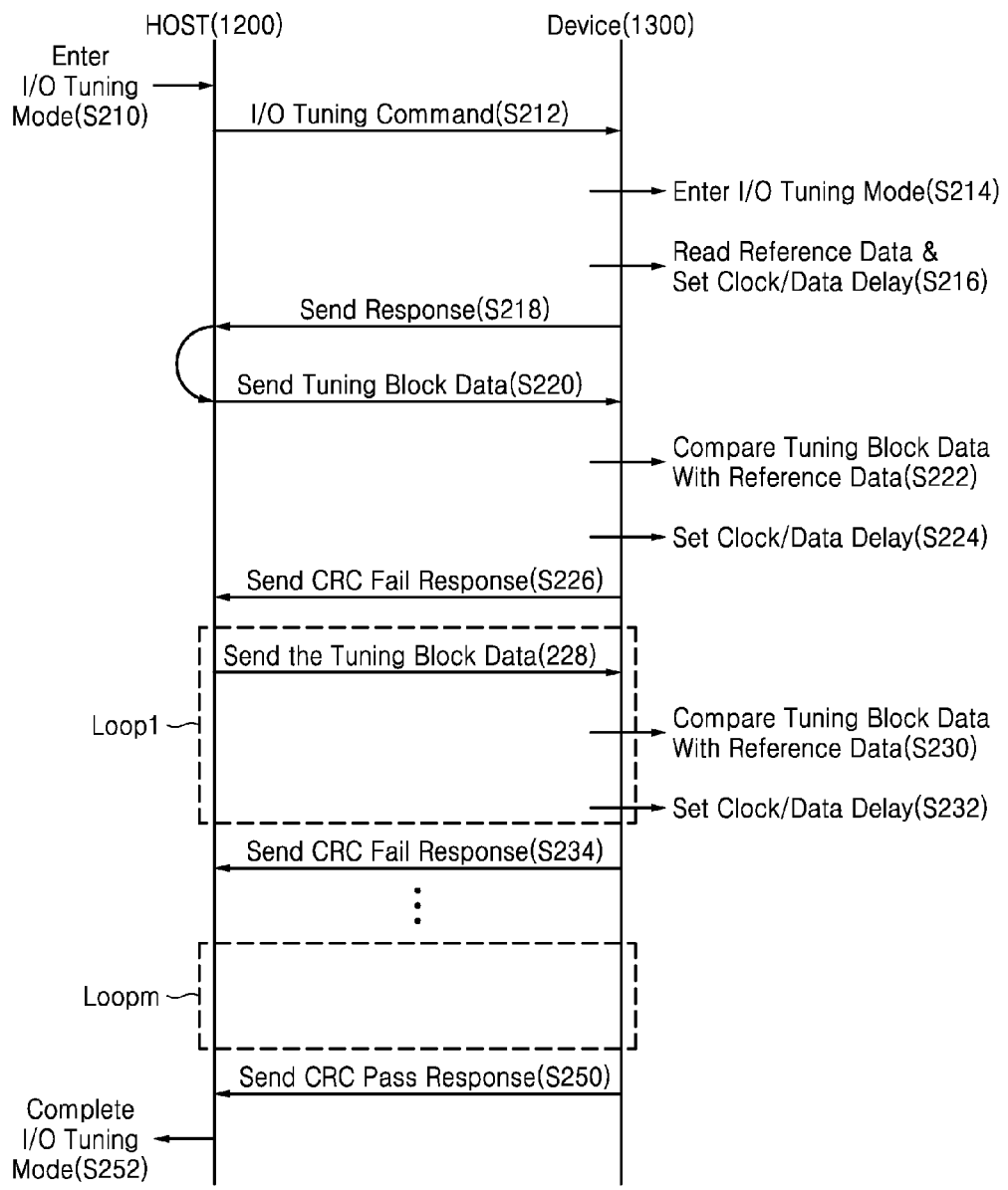
FIG. 25 is an operating diagram illustrating one approach to sequentially searching for a data valid window in the eMMC system of FIG. 18.

FIG. 25 is an operating diagram further illustrating the process of sequentially searching for an improved (or maximized) data valid window in the eMMC system 1100 of FIG. 18.

Referring to FIGS. 18 to 25, when the host 1200 enters into an I/O tuning mode to perform the I/O tuning process (S210), the host 1200 transmits an I/O tuning command CMD to the eMMC 1300 through a command bus 1102 (S212).

The eMMC 1300 enters into the I/O tuning mode which may perform the I/O tuning process in response to the I/O tuning command CMD (S214).

The eMMC 1300 which entered into the I/O tuning mode, i.e., the CPU 1340, transmits a reference data read command to the flash interface 1360. The flash interface 1360 reads reference data signals REFD stored in the flash memory 1370, and stores the read reference data signals REFD in the memory 1350 (S216). The eMMC 1300, e.g., the CPU 1340, sets each adjusting code SELC and SEL1 to SEL8 as an initial value or a default value (S216). According to an example embodiment, this process may be omitted.

The eMMC 1300 transmits a response RES, e.g., a ready response, to the host 1200 through the command bus 1102 (S218).

The host 1200, e.g., a processing device 1211, transmits tuning block data signals synchronized with a clock CLK to the eMMC 1300 in response to the ready response (S220).

A timing diagram for tuning block data signals DAT_HOST[7:0] and a clock CLK_HOST is the same as illustrated in FIGS. 21 to 23B.

The clock delay circuit 1331-1 receives a clock CLK, and outputs a delay-adjusted clock DCLK based on a clock adjusting code SELC set as a default value. Each data delay circuit 1333-1 to 1333-8 receives each tuning block data signal DAT[0] to DAT[7], and outputs each delay-adjusted data signal DDAT[0] to DDAT[7] based on each data adjusting code SEL1 to SEL8 set as each default value.

Each latch circuit 1337-1 to 1337-8 latches each data signal DDAT[0] to DDAT[7] output from each data delay circuit 1333-1 to 1333-8 in response to a delay-adjusted clock DCLK. Delay-adjusted data signals DWDATA output from the latch circuits 1337-1 to 1337-8 are stored in the memory 1350.

The data comparison circuit 1345 compares between the delay-adjusted data signals DWDATA and the reference signals REFD output from the memory 1350, and outputs comparison signals INF to the CPU 1340 (S222).

The CPU 1340 sets or programs each adjusting code SELC and SEL1 to SEL8 to each programmable memory 1331-2 and 1335-1 to 1335-8 based on the comparison signals INF (S224).

When the CPU 1340 may not search for an optimal sampling point based on the comparison signals INF, the CPU 1340 outputs a CRC fail response RES to the host 1200 (S226).

The host 1200, e.g., a processing device 1211, transmits tuning block data signals synchronized with a clock CLK to the eMMC 1300 in response to the CRC fail response RES (S228). The clock delay circuit 1331-1 receives a clock CLK and outputs a delay-adjusted clock DCLK based on the clock adjusting code SELC set in the step S224.

Each data delay circuit 1333-1 to 1333-8 receives each tuning block data signal DAT[0] to DAT[7], and outputs each delay-adjusted data signal DDAT[0] to DDAT[7] based on each data adjusting code SEL1 to SEL8 set in the step S224.

Each latch circuit 1337-1 to 1337-8 latches each data signal DDAT[0] to DDAT[7] output from each data delay circuit 1333-1 to 1333-8 in response to a delay-adjusted clock DCLK. Delay-adjusted data signals DWDATA output from the latch circuits 1337-1 to 1337-8 are stored in the memory 1350.

The data comparison circuit 1345 compares between the delay-adjusted data signals DWDATA and the reference signals REFD output from the memory 1350, and outputs comparison signals INF to the CPU 1340 (S230).

The CPU 1340 sets each adjusting code SELC and SEL1 to SEL8 to each programmable memory 1331-2 and 1335-1 to 1335-8 based on the comparison signals INF (S232). The CPU 1340 outputs a CRC fail response RES to the host 1200 when the CPU 1340 may not search out an optimal sampling point based on the comparison signals INF (S234).

Until the CPU 1340 searches out an optimal sampling point based on the comparison signals INF, loops loop1 to loopm, where m is a natural number, are iterated. When the CPU 1340 searches out an optimal sampling point based on the comparison signals INF, the CPU 1340 sets each adjusting code SELC and SEL1 to SEL8 to each programmable memory 1331-2 and 1335-1 to 1335-8 based on the comparison signals INF.

In addition, the CPU 1340 outputs a CRC fail response RES to the host 1200. The host 1200, e.g., the processing device 1211, lastly transmits tuning block data signals synchronized with a clock CLK to the eMMC 1300 in response to the CRC fail response RES.

The clock delay circuit 1331-1 receives a clock and outputs a delay-adjusted clock DCLK based on a clock adjusting code SELC set in a right previous loop. Each data delay circuit 1333-1 to 1333-8 receives each tuning block data signal DAT[0] to DAT[7], and outputs each delay-adjusted data signal DDAT[0] to DDAT[7] based on each data adjusting code SEL1 to SEL8 set in a right previous loop.

Each latch circuit 1337-1 to 1337-8 latches each data signal DDAT[0] to DDAT[7] output from each data delay circuit 1333-1 to 1333-8 in response to a delay-adjusted clock DCLK. Delay-adjusted data signals DWDATA output from the latch circuits 1337-1 to 1337-8 are stored in the memory 1350.

The data comparison circuit 1345 compares between the delay-adjusted data signals DWDATA and the reference signals REFD output from the memory 1350, and outputs comparison signals INF to the CPU 1340 (S230).

When the I/O tuning process is completed, the CPU 1340 transmits a CRC pass response RES to the host 1200 in response to the comparison signals INF (S250). The host 1200 completes an I/O tuning mode based on the CRC pass response RES (S252).

Figure 26:
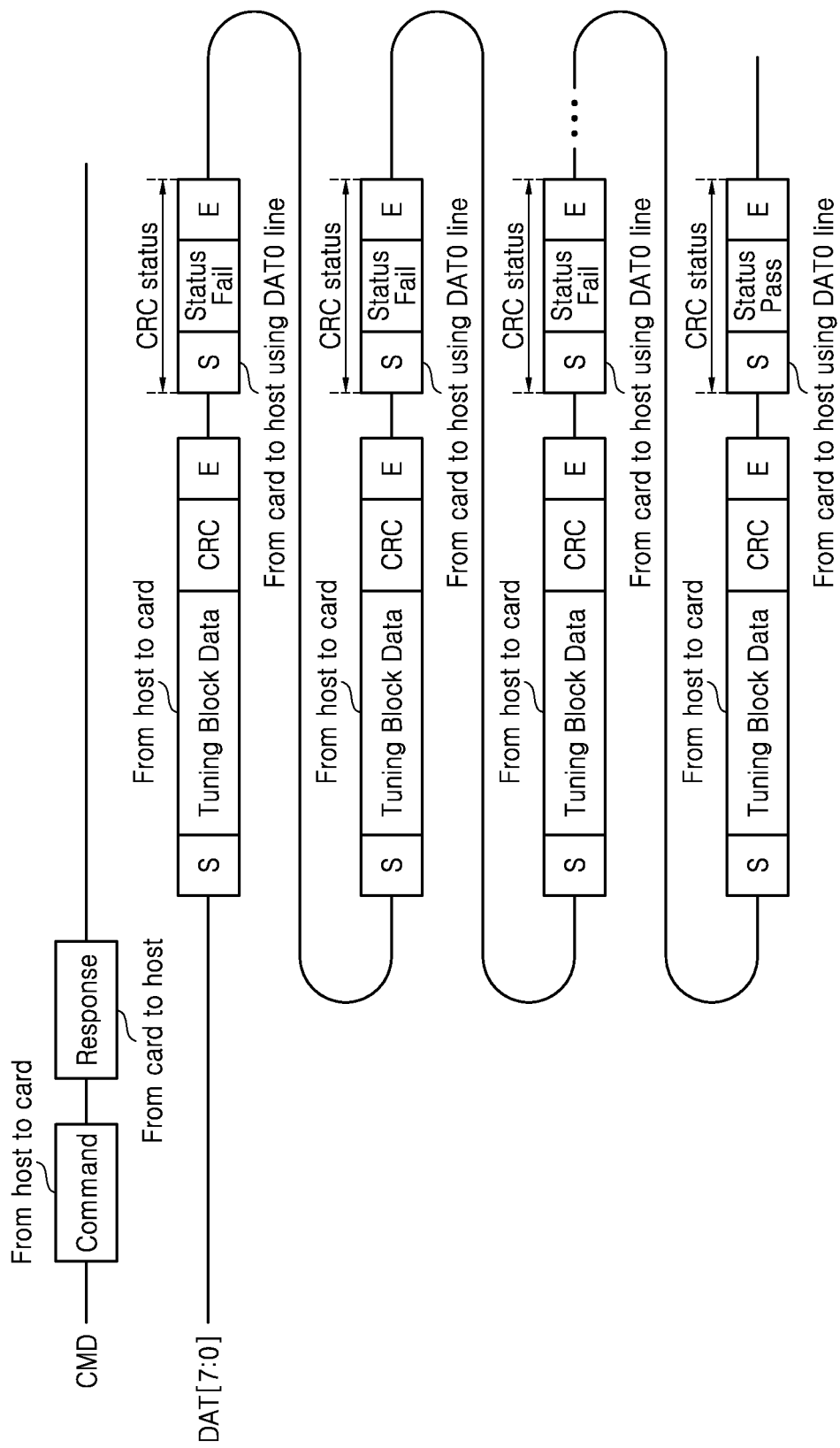
FIG. 26 is an operating diagram illustrating an I/O tuning command and I/O tuning operation according to certain embodiments of the inventive concept.

FIG. 26 is an operating diagram further illustrating an I/O tuning command and operation according to certain embodiments of the inventive concept. Referring to FIGS. 18 to 26, the eMMC 1300 transmits a normal response to the host 1200 in response to an I/O tuning command output from the host 1200.

The host 1200 transmits tuning block data signals to the eMMC 1300 based on the response. The eMMC 1300 transmits a CRC status indicating if an I/O tuning process is completed to the host 1200 through a first data bus as explained by referring to FIG. 25.

When the CRC status is a CRC fail response indicating Status Fail, the host 1200, until receiving a CRC pass response from the eMMC 1300, transmits tuning block data signals synchronized with a clock CLK to the eMMC 1300 whenever receiving a CRC fail response from the eMMC 1300. The CRC pass response may be a CRC status including Status Pass.

A host controlling an eMMC according to an example embodiment of the present inventive concepts may secure a data valid window by directly correcting an input timing of the eMMC. The eMMC according to an example embodiment of the present inventive concepts may easily operate in a high speed bus mode like a DDR 400 mode by securing the data valid window. In addition, the host controlling the eMMC according to an example embodiment of the present inventive concepts may abbreviate or minimize an I/O tuning process by directly correcting an input timing of the eMMC.

An eMMC according to an example embodiment of the present inventive concepts may increase a data write performance. The eMMC according to an example embodiment of the present inventive concepts may perform an I/O tuning process inside the eMMC before the data write operation is performed.

The eMMC according to an example embodiment of the present inventive concepts may decrease skew between a clock and data signals by adjusting a delay of a clock pass and/or each delay of data passes through the I/O tuning process. Accordingly, the eMMC may secure a data valid window and process write data signals at a maximum transmission speed, thereby increasing throughput of overall data signals.

What is claimed is:

1. An embedded multimedia card (eMMC) that operates under the control of a host, the eMMC comprising:
a clock channel that receives a clock from the host;
a plurality of data channels that each receives a respective data signal among a plurality of data signals communicated from the host; and
a command/response channel that receives a SWITCH command from the host, wherein the SWITCH command includes a plurality of delay offset values that each respectively define an adjustment delay within the eMMC for one of the plurality of data signals,
wherein each data channel in the plurality of data channels comprises a data delay circuit that responds to a corresponding one of the plurality of delay offset values to apply an adjustment delay defined by the corresponding delay offset value to a corresponding data signal communicated by the data channel, and
wherein a response communicated via the command/response channel to the host includes at least one CRC status token indicating a valid/invalid state for at least one of the plurality of data signals.

2. The eMMC of claim 1, further comprising:
an extended card specific data (CSD) register ("EXT_CSD register") having a designated VENDOR_SPECIFIC_FIELD field that stores the plurality of delay offset values.

3. The eMMC of claim 1, wherein at least one of the data delay circuits comprises:
a plurality of series-connected buffers, each buffer in the plurality of series-connected buffers applying a delay to the corresponding data signal to generate a plurality of delayed data signals; and
a selector that selects one of the plurality of delayed data signals in response to the corresponding delay offset value.

4. The eMMC of claim 1, wherein the command/response channel repeatedly receives the SWITCH command including different delay offset values from the host until the at least one CRC status token indicates an invalid state for all of the plurality of data signals.

5. The eMMC of claim 1, further comprising:
a clock delay circuit that applies an adjustment delay to the clock in response to a clock adjusting code to generate a delayed clock.

6. The eMMC of claim 5, further comprising:
a central processing unit (CPU) that determines the clock adjusting code; and
a programmable memory that stores the clock adjusting code.

7. The eMMC of claim 5, further comprising:
latch circuits that latch each output data signal in response to the delayed clock; and
a code generation circuit that compares reference data signals with output data signals latched by the latch circuits to generate the clock adjusting code.

8. The eMMC of claim 7, wherein the code generation circuit is enabled only during an I/O tuning process.

9. The eMMC of claim 8, wherein the code generation circuit comprises:
a memory that stores the output data signals and the reference data signals; and
a data comparison circuit that compares the output data signals and the reference data signals provided by the memory to generate comparison signals, wherein the CPU generates the clock adjusting code based on the comparison signals.

10. The eMMC of claim 5, wherein the clock delay circuit comprises:
first delay circuits that each generate a delay clock having a different delay; and
a first selection circuit that outputs one of output signals of the first delay circuits based on the clock adjusting code, and
wherein each of the data delay circuits includes:
second delay circuits that generate a delay data signal having a different delay based on a corresponding data signal among the data signals, and
a second selection circuit outputting one of output signals to the second delay circuits based on a corresponding data adjusting code among the data adjusting codes.

11. A method for operating an eMMC system including an embedded multimedia card (eMMC) and a host, the method comprising:
transmitting a SWITCH command from the host to the eMMC, wherein the SWITCH command includes delay offset values for a plurality of data signals received by the eMMC from the host, where each delay offset value defines a respective adjustment delay for a corresponding one of the data signals;
transmitting a Get Tuning Block command from the host to the eMMC to instruct the eMMC to determine the valid/invalid state of the data signals;
receiving a response communicated from the eMMC to the host in response to the Get Tuning Block command;
transmitting data blocks from the host to the eMMC;
transmitting at least one CRC status token from the eMMC to the host in response to the data blocks, wherein the at least one CRC status token indicates the valid/invalid state of the data signals to the host;
repeatedly transmitting the SWITCH command, including different delay offset values, and the Get Tuning Block command, from the host to the eMMC until receiving the at least one CRC status token indicating that the data signals are all invalid;
determining in the host, a number of valid data signal instances for each data signal for a range of the different delay offset values; and
transmitting the SWITCH command from the host to the eMMC to set a selected delay offset value for each of the data signals, wherein the selected delay offset value for each of the data signals corresponds to one of the valid data signal instances for the data signal and further defines an adjustment delay which corresponds to a maximized data valid window for the data signal.

12. A method of operating a host controlling an embedded multimedia card (eMMC), the method comprising:
transmitting an input/output (I/O) tuning command from the host to the eMMC for causing the eMMC to perform a tuning operation for individually tuning a plurality of delays associated with a plurality of data channels through which the eMMC receives data from the host;

receiving at the host a response to the I/O tuning command from the eMMC, the response indicating that the eMMC is ready to commence the tuning operation;

based in the response, iteratively transmitting tuning block data signals synchronously with a clock from the host to the eMMC until receiving a CRC pass response from the eMMC;

defining a plurality of adjustment delays, each adjustment delay corresponding to one of the plurality of data channels in the eMMC receiving one of the tuning block data signals from the host, by comparing reference data signals with the iteratively provided tuning block data signals; and latching each one of the tuning block data signals in response to a delayed version of the clock during a write operation.

13. The method of claim 12, wherein the adjustment delay for each one of the plurality of data channels is defined when the eMMC switches to a HS 200 mode or a DDR 400 mode of operation.

* * * * *